US009339872B2

(12) United States Patent
Zenke et al.

(10) Patent No.: US 9,339,872 B2
(45) Date of Patent: May 17, 2016

(54) MACHINING APPARATUS AND DEBURRING DEVICE

(71) Applicant: NITTAN VALVE CO., LTD., Hadano-shi, Kanagawa (JP)

(72) Inventors: Atsushi Zenke, Hadano (JP); Yasunori Oishi, Hadano (JP)

(73) Assignee: NITTAN VALVE CO., LTD., Hadano-shi (JP)

( * ) Notice: Subject to any disclaimer, the term of this patent is extended or adjusted under 35 U.S.C. 154(b) by 0 days.

(21) Appl. No.: 14/421,009

(22) PCT Filed: Feb. 19, 2014

(86) PCT No.: PCT/JP2014/053899
§ 371 (c)(1),
(2) Date: Feb. 11, 2015

(87) PCT Pub. No.: WO2015/125231
PCT Pub. Date: Aug. 27, 2015

(65) Prior Publication Data
US 2016/0023279 A1    Jan. 28, 2016

(51) Int. Cl.
*B24B 5/04* (2006.01)
*B23B 5/16* (2006.01)
(Continued)

(52) U.S. Cl.
CPC . *B23B 5/167* (2013.01); *B23B 5/16* (2013.01); *B23P 23/02* (2013.01); *B24B 5/04* (2013.01); *F01L 3/24* (2013.01); *B23B 2215/24* (2013.01); *B23B 2220/08* (2013.01)

(58) Field of Classification Search
CPC ............ B24B 5/04; B23B 5/16; B23B 5/167; B23B 2220/08; B23B 2215/24; F01L 3/24; B23P 23/02; E01B 31/12; E01B 31/17
USPC ................ 451/49, 51, 70, 180, 181, 246, 252
See application file for complete search history.

(56) References Cited

U.S. PATENT DOCUMENTS 2,110,931 A * 3/1938 Dyer ...................... B24B 15/04
125/11.01
2,143,570 A * 1/1939 Norton .................... B23C 3/05
408/83.5
(Continued)

FOREIGN PATENT DOCUMENTS

JP    60-138629 U    9/1985
JP    01-079537 U    5/1989
(Continued)

OTHER PUBLICATIONS

International Search Report dated Mar. 25, 2014, issued in correponding application No. PCT/JP2014/053899.
(Continued)

*Primary Examiner* — Eileen Morgan
(74) *Attorney, Agent, or Firm* — Westerman, Hattori, Daniels & Adrian, LLP

(57) ABSTRACT

A pair of pinching members pinching a workpiece stem portion, and a deburring tool performing deburring onto the workpiece stem portion pinched by the pair of pinching members are disposed under a pair of guide rails. The deburring tool has a recess so that an opening of the recess faces the other end face of the workpiece stem portion, and is capable of a displacement motion in an axis extension direction of the recess while rotating around the recess axis, and a recess inner circumferential surface is formed so as to reduce its diameter as it goes from the recess opening side toward a recess internal side, and a blade portion is provided on the recess inner circumferential surface. Thereby, it is possible to perform deburring without increasing the machining line length, and prevent abnormal wear of a rubbing stone due to the deburring.

13 Claims, 14 Drawing Sheets

(51) Int. Cl.
*B23P 23/02* (2006.01)
*F01L 3/24* (2006.01)

(56) References Cited

U.S. PATENT DOCUMENTS

| | | | | | |
|---|---|---|---|---|---|
| 2,182,543 | A | * | 12/1939 | Murrah | B24B 7/16 451/242 |
| 4,214,139 | A | | 7/1980 | Kozlov et al. | |
| 4,630,403 | A | * | 12/1986 | Belthle | B24B 15/04 451/247 |
| 5,199,222 | A | * | 4/1993 | Leroux | B24B 15/04 451/252 |
| 5,319,916 | A | * | 6/1994 | Ritt | B24B 5/22 451/252 |
| 5,484,327 | A | * | 1/1996 | Kovach | B24B 5/01 451/11 |
| 5,674,111 | A | * | 10/1997 | Harada | B24B 5/28 29/557 |
| 2002/0187734 | A1 | * | 12/2002 | Saiki | B24B 17/025 451/49 |
| 2006/0040585 | A1 | * | 2/2006 | Montandon | B24B 15/04 451/5 |

FOREIGN PATENT DOCUMENTS

| | | |
|---|---|---|
| JP | 05-060756 U | 8/1993 |
| JP | 06-000638 U | 1/1994 |
| JP | 06-082042 U | 11/1994 |
| JP | 08-155747 A | 6/1996 |

OTHER PUBLICATIONS

Decision to Grant a Patent dated Jul. 23, 2014, issued in corresponding application No. JP2014-527395 (2 pages).

* cited by examiner

MACHINING APPARATUS AND DEBURRING DEVICE

TECHNICAL FIELD

The present invention relates to a machining apparatus which performs machining with respect to a machining object having a stem portion and an expanded diameter portion which is integrated with one end side of the stem portion, so as to expand its diameter larger than the stem portion, and a deburring device which is used in the machining apparatus.

BACKGROUND ART

As a machining object, there is one having a stem portion and an expanded diameter portion which is integrated with one end side of the stem portion, so as to expand its diameter larger than the stem portion. Such a machining object is, as shown in Patent Document 1, usually, chamfered at the other end rim portion of the stem portion by use of a turning tool for chamfering in a chamfering process in a process line.

Meanwhile, the above-described machining object is required to be finally a constant length as the entire length according to its type. Therefore, a cutting process is provided in the machining line (process line), and in the cutting process, the stem portion of the machining object is cut to be a predetermined length in order to cut the entire length be the constant length. In this case, in the cutting process, a burr is generated on a cut end face rim portion of the stem portion of the machining object. However, this burr is eliminated in accordance with grinding of the stem portion by use of a rubbing stone in the following grinding process. Therefore, it is possible to eliminate the burr from the cut end face rim portion of the stem portion even though a specific process is not provided for deburring, thereby it is possible to prevent an increase in length of the machining line (manufacturing line) for deburring.

PRIOR ART DOCUMENT

Patent Document

Patent Document 1: Japanese Unexamined Utility Model No. Hei-5-60756

SUMMARY OF THE INVENTION

Problems to be Solved by the Invention

However, as described above, in the case where not only the stem portion, but also the burr generated in the cutting process is eliminated in the grinding process, load is centralized on a portion of the rubbing stone for grinding the burr, which leads to rapid progress in ablation of the portion of the rubbing stone (abnormal wear). Therefore, the replacement frequency of rubbing stones is naturally increased.

The present invention has been achieved in consideration of the above-described circumstances. A primary object of the present invention is, in a machining apparatus which performs machining with respect to a machining object which has a stem portion and an expanded diameter portion which is integrated with one end side of the stem portion, so as to expand its diameter larger than the stem portion, sequentially by a cutting device and a grinding device, to perform deburring without increasing a length of a machining line between the cutting device and the grinding device, and prevent abnormal wear of a rubbing stone based on the deburring by the grinding device.

A secondary object of the present invention is to provide a deburring device which is used in the machining apparatus.

Means for Solving the Problems

In order to achieve the primary object, in the present invention (the invention according to a first aspect),
a machining apparatus which, on condition that a machining object has a stem portion and an expanded diameter portion which is integrated with one end side of the stem portion, so as to expand its diameter larger than the stem portion, includes a cutting device that cuts the stem portion of the machining object, a grinding device that grinds the stem portion of the machining object, and a pair of carrier members which are disposed so as to extend with a space between the cutting device and the grinding device, the pair of carrier members carry the machining object from the cutting device to the grinding device, the machining apparatus in which, when the pair of carrier members carry the machining object, the expanded diameter portion of the machining object is made to stride over the pair of carrier members, and the stem portion of the machining object is suspended downward from between the pair of carrier members,
a pair of pinching members which pinch the stem portion of the machining object when the machining object is carried to a predetermined machining position on the pair of carrier members, and a deburring tool which is disposed lower than the pair of pinching members, to perform deburring with respect to the stem portion of the machining object pinched by the pair of pinching members are disposed under the pair of carrier members,
the deburring tool has a recess for insertion of the stem portion of the machining object pinched by the pair of pinching members so that an opening of the recess faces the other end face of the stem portion of the machining object, and is capable of a displacement motion in an axis extension direction of the recess while rotating around an axis of the recess,
an inner circumferential surface of the recess in the deburring tool is formed so as to reduce its diameter as an inner diameter of the recess partitioned by the inner circumferential surface of the recess goes from an opening side of the recess toward an internal side of the recess, and
a deburring machining section for performing deburring is provided on the inner circumferential surface of the recess. A preferred embodiment of the first aspect is as described in aspects 2 to 12.

In order to achieve the secondary object, in the present invention (the invention according to a thirteenth aspect),
a deburring device which is used in a machining apparatus which, on condition that a machining object has a stem portion and an expanded diameter portion which is integrated with one end side of the stem portion, so as to expand its diameter larger than the stem portion, includes a cutting device that cuts the stem portion of the machining object, a grinding device that grinds the stem portion of the machining object, and a pair of carrier members which are disposed so as to extend with a space between the cutting device and the grinding device, the pair of carrier members carry the machining object from the cutting device to the grinding device, the machining apparatus in which, when the pair of carrier members carry the machining object, the expanded diameter portion of the machining object is made to stride over the pair of carrier members, and the stem portion of the machining object is suspended downward from between the pair of carrier members, a pair of pinching members which pinch the stem portion of the machining object when the machining object is carried to a predetermined machining position on the pair of carrier members, and a deburring tool which is disposed lower than the pair of pinching members, to perform deburring with respect to the stem portion of the machining object pinched by the pair of pinching members are disposed under the pair of carrier members, the deburring tool has a recess for insertion of the stem portion of the machining object pinched by the pair of pinching members so that an opening of the recess faces the other end face of the stem portion of the machining object, and is capable of a displacement motion in an axis extension direction of the recess while rotating around an axis of the recess, an inner circumferential surface of the recess in the deburring tool is formed so as to reduce its diameter as an inner diameter of the recess partitioned by the inner circumferential surface of the recess goes from an opening side of the recess toward an internal side of the recess, and a deburring machining section for performing deburring is provided on the inner circumferential surface of the recess.

Effects of the Invention

In accordance with the present invention (the invention according to the first aspect), after cutting the stem portion of the machining object by the cutting device, the machining object is carried to the grinding device by the pair of carrier members serving as carrier means, at the time of carrying the machining object, the expanded diameter portion of the machining object is made to stride over the pair of carrier members, and the stem portion of the machining object is suspended downward between the pair of carrier members. Therefore, when the deburring tool is moved up after the stem portion of the machining object is pinched by the pair of carrier members, the stem portion of the machining object enters into the recess in the deburring tool, and the burr on the cut end face rim portion of the stem portion (the other end face rim portion of the stem portion) in the machining object is eliminated by the deburring machining section on the inner circumferential surface of the recess in the deburring tool. Therefore, it is possible to eliminate the burr on the cut end face rim portion of the stem portion (the other end face rim portion of the stem portion) in the machining object by the pair of pinching members and the deburring tool disposed under the pair of carrier members, that is, in the same way as conventionally, it is possible to perform deburring without increasing a machining line length between the cutting device to the grinding device. In accordance therewith, the rubbing stone in the grinding device does not perform deburring, which makes it possible to prevent generation of abnormal wear in the rubbing stone in the grinding device.

In addition, in this case, the inner circumferential surface of the recess in the deburring tool is formed so as to reduce its diameter as an inner diameter of the recess partitioned by the inner circumferential surface of the recess goes from an opening side of the recess toward an internal side of the recess, and the deburring machining section of or performing deburring is provided on the inner circumferential surface of the recess. Therefore, as the deburring tool is moved up, the burr on the cut end face rim portion of the stem portion in the machining object comes into contact with the deburring machining section on the inner circumferential surface of the recess opening side in the deburring tool to the deburring portion at the recess internal inner circumferential surface sequentially, to be eliminated, that is, in any case, deburring is not performed intensively on a specific area of the deburring machining section. Therefore, even when deburring is performed by use of a deburring tool in place of the rubbing stone in the grinding device, it is possible to prevent the deburring tool from being incapable of exceptionally-fast deburring.

In accordance with the invention according to the second aspect, the pair of pinching members are provided so as to be capable of a displacement motion in a displacement motion direction of the deburring tool, and biasing means is associated with the pair of pinching members so as to increase repulsion force as the pair of pinching members approach the pair of carrier members. Therefore, it is possible to keep pressing force per unit displacement applied to the stem portion of the machining object constant at the time of deburring, and it is possible to acquire the desired machining quality with respect to the stem portion (the cut end face rim portion) of the machining object. That is, because it is possible to increase repulsion force of the biasing means according to an increase in displacement motion of the deburring tool, it is possible to prevent an excessive displacement motion of the deburring tool, and it is possible to suppress overload at the time of deburring.

In accordance with the invention according to the third aspect, the invention further includes displacement motion detecting means for detecting a displacement motion of the pair of pinching members, and control means for controlling the deburring tool to stop deburring machining with respect to the stem portion of the machining object pinched by the pair of pinching members when it is detected that the pair of pinching members make a displacement motion from a reference position at which external force for making a displacement motion is not applied, to a predetermined displacement motion position based on information from the displacement motion detecting means. Therefore, it is possible to keep an amount of machining (an amount of deburring) with respect to the stem portion (the cut end face rim portion) of the machining object constant, which makes it possible to manufacture products with constant quality.

In accordance with the invention according to the fourth aspect, the invention further includes a first stopper which is capable of selecting a movement restriction mode of restricting the machining object at a predetermined machining position on the pair of carrier members from moving from the predetermined machining position to a carrying downstream side, and a movement allowable mode of releasing the movement restriction mode to allow the machining object to move, and which switches to the movement allowable mode when the pair of pinching members pinch (hold) the machining object at the predetermined machining position, and switches to the movement restriction mode when the pair of pinching members release pinching (holding) of the machining object at the predetermined machining position, and a second stopper which restricts a movement of the machining object at a predetermined standby position on a carrying upstream side from the predetermined machining position on the pair of carrier members, and on the other hand, when the first stopper selects the movement restriction mode, releases only the movement restriction on a front machining object among machining objects on the carrying upstream side from the predetermined standby position, to move the front machining object toward the first stopper. Therefore, even in the case where a machining object having a stem portion and an expanded diameter portion integrated with one end side of the stem portion so as to expand its diameter larger than the stem portion is carried from the cutting device toward the grinding device by use of the pair of carrier members, it is possible to securely position only one machining object to be machined at a predetermined machining position between the both devices sequentially according to machining timing.

In accordance with the invention according to the fifth aspect, the pair of carrier members are set as a pair of guide rails so that its height position becomes higher as it goes toward the carrying upstream side, and a machining object carried by the pair of carrier members slides on the pair of carrier members under its own weight. Therefore, it is possible to simplify the structure of the pair of carrier members (carrier means) by utilizing the own weight of the machining object, and even under the structure, it is possible to securely position only one machining object to be machined at a predetermined machining position sequentially according to machining timing.

In accordance with the invention according to the sixth aspect, the first stopper is set so as to enter a moving region of the stem portion of the machining object when the first stopper selects the movement restriction mode, and exit from the moving region of the stem portion of the machining object when the first stopper selects the movement allowable mode. Therefore, when the first stopper selects the movement allowable mode, the machining object is carried out of the predetermined machining position, and on the other hand, when the first stopper selects the movement restriction mode, the stem portion of the machining object comes into contact with the first stopper, and the expanded diameter portion of the machining object rotates to the carry-out side centering on the contact portion, and the carry-out side of the expanded diameter portion comes into contact with the pair of carrier members (the pair of guide rails). Thereby, it is possible to position the machining object in a stable state (in a posture that the stem portion of the machining object is perpendicular to the pair of carrier members) at the predetermined machining position by the pair of carrier members and the first stopper, and even in a simple structure in which the first stopper merely enters the moving region of the stem portion of the machining object, it is possible to securely stop carrying the machining object at the predetermined machining position by effectively utilizing the pair of carrier members (the pair of guide rails). As a result, it is possible to securely pinch (hold) the stem portion of the machining object by the pair of pinching members.

In accordance with the invention according to the seventh aspect, an attachment substrate having a through-hole is provided so as to be capable of adjusting a tilting motion in a standing state, the attachment substrate is disposed so that the pair of carrier members and a machining object carried by the pair of carrier members pass through the through-hole between the cutting device and the grinding device, the deburring tool is attached to the attachment substrate via deburring tool driving means for causing the deburring tool to make a displacement motion, the pair of pinching members are provided on the attachment substrate on the upper side of the deburring tool, and the attachment substrate is tilted so that the opening of the recess in the deburring tool faces the other end face of the stem portion of the machining object restricted from moving by the first stopper by adjusting a tilting motion. Therefore, not only it is possible to collectively attach the deburring tool and the pair of pinching members to the attachment substrate, thereby achieving consolidation and compactification of those, but also, even when the stem portion of the machining object is in a stable posture of being perpendicular to the pair of carrier members (a posture tilted to the vertical direction) at the predetermined machining position, it is possible to simply adjust the deburring tool into an optimum posture with respect to the stem portion (the cut end face) of the machining object from the standpoint of deburring due to adjustment in tilting motion of the attachment substrate.

In accordance with the invention according to the eighth aspect, the pair of pinching members are attached to the attachment substrate so as to be capable of a displacement motion in an axis extension direction of the deburring tool, and the biapsing means is interposed between the pair of pinching members and the attachment substrate so as to increase repulsion force as the pair of pinching members approach the pair of carrier members. Therefore, it is possible to keep pressing force per unit displacement applied to the stem portion of the machining object constant at the time of deburring, and it is possible to acquire the desired machining quality with respect to the stem portion (the cut end face rim portion) of the machining object. That is, because it is possible to increase repulsion force of the biasing means according to an increase in displacement motion of the deburring tool, it is possible to suppress an excessive displacement motion of the deburring tool, and it is possible to suppress overload at the time of deburring.

In accordance with the invention according to the ninth aspect, the invention further includes pinching state detecting means for detecting a pinching state of the pair of pinching members with respect to the stem portion of the machining object at the predetermined machining position, first stopper mode change detecting means for detecting a mode change of the first stopper, and control means for switching the first stopper to the movement restriction mode when releasing pinching with respect to the stem portion of the machining object at the predetermined machining position to carry out the machining object based on information from the pinching state detecting means, and for controlling the second stopper to release the movement restriction on the front machining object among machining objects on the carrying upstream side from the predetermined standby position when the mode of the first stopper is changed to the movement restriction mode based on information from the first stopper mode change detecting means. Therefore, it is possible to carry out a machining object finished with deburring machining at the predetermined machining position, and on the other hand, it is possible to feed a new machining object to be machined to the predetermined machining position in place of the carried-out machining object, and it is possible to precisely automate deburring onto the stem portion of the machining object.

In accordance with the invention according to the tenth aspect, the invention further includes machining object detecting means for detecting whether or not there is a machining object at the predetermined machining position, and the control means controls the pair of pinching members so that the pair of pinching members pinch the stem portion of the machining object at the predetermined machining position when it is judged that there is a machining object at the predetermined machining position based on information from the machining object detecting means, and the control means moves the deburring tool toward the end face of the stem portion of the machining object when it is judged that the pair of pinching members pinch the stem portion of the machining object at the predetermined machining position based on information from the pinching state detecting means. Therefore, it is possible to reliably perform deburring with respect to the stem portion of the machining object under automation.

In accordance with the invention according to the eleventh aspect, a blade portion of a blade tool is disposed, as the deburring machining section, on the inner circumferential surface of the recess in the deburring tool so as to extend in a depth direction of the recess along the inner circumferential surface of the recess. Therefore, it is possible to reliably eliminate a burr on the stem portion of the machining object by the blade portion of the blade tool.

In accordance with the invention according to the twelfth aspect, a notch is formed in the deburring tool so as to extend in the axis extension direction of the recess in the deburring tool, and the blade tool is attached to a notched end face of the notch so as to be detachable. Therefore, it is possible to keep up a deburring function of the deburring tool by replacing only the blade tool therein without changing the deburring tool itself.

In addition, it is possible to attach the blade tool so as to be detachable with respect to the notched end face of the notch, and it is possible to easily replace the blade tool.

In accordance with the invention according to the thirteenth aspect, it is possible to provide an optimum one as a deburring device used in the machining apparatus according to the first aspect.

BRIEF DESCRIPTIONS OF THE DRAWINGS

BEST MODES FOR CARRYING OUT THE INVENTION

Hereinafter, an embodiment of the present invention will be described with reference to the drawings.

Figure 1:
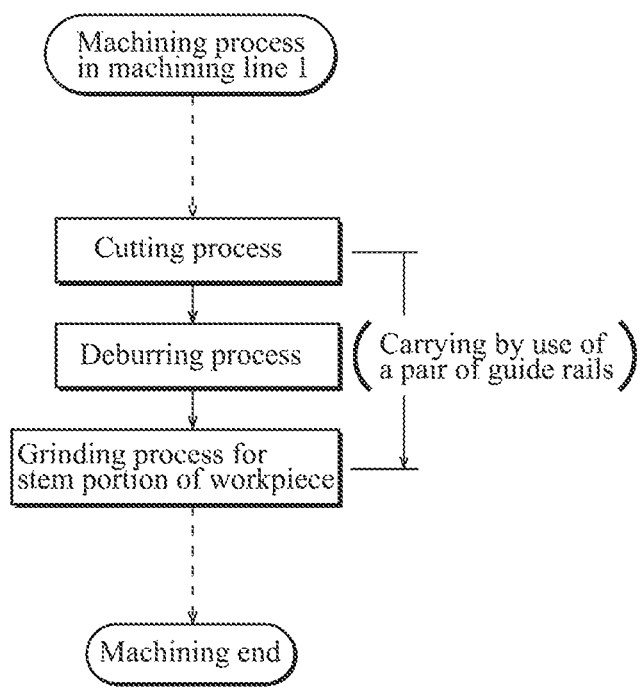
FIG. 1 is a process chart for explanation of machining processes of a machining line according to an embodiment.

FIG. 1 shows a process chart of a machining line (machining apparatus) 1 for manufacturing an inlet/outlet valve (hereinafter called a valve). This valve machining line 1 has a plurality of processes such as a cutting process, a deburring process following the cutting process, and a grinding process following the deburring process as processes, and a workpiece W serving as a machining object is carried from the respective processes to the following processes by carrier means existing among the respective processes.

In this case, the workpiece W is already machined into a basic valve shape until the workpiece W is carried in the cutting process, and the workpiece W has a stem portion W1, a head portion W2 serving as an expanded diameter portion which is integrated with the one end side of the stem portion W1 so as to expand its diameter larger than the stem portion W1. Meanwhile, in this machining stage, the length in its axis extension direction of the stem portion W1 is longer than a regular length (including an imaginary line portion before cutting in FIG. 2).

Figure 2:
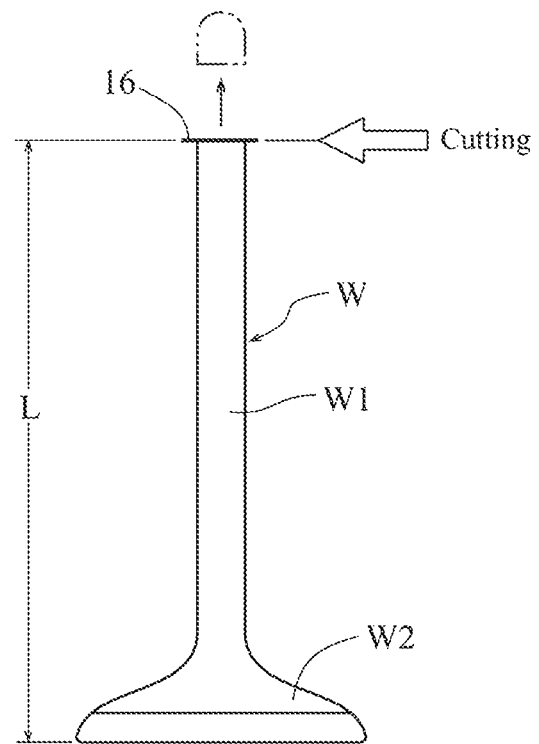
FIG. 2 is an explanatory diagram for explanation of a workpiece serving as a machining object of the machining line according to the embodiment.
Figure 3:
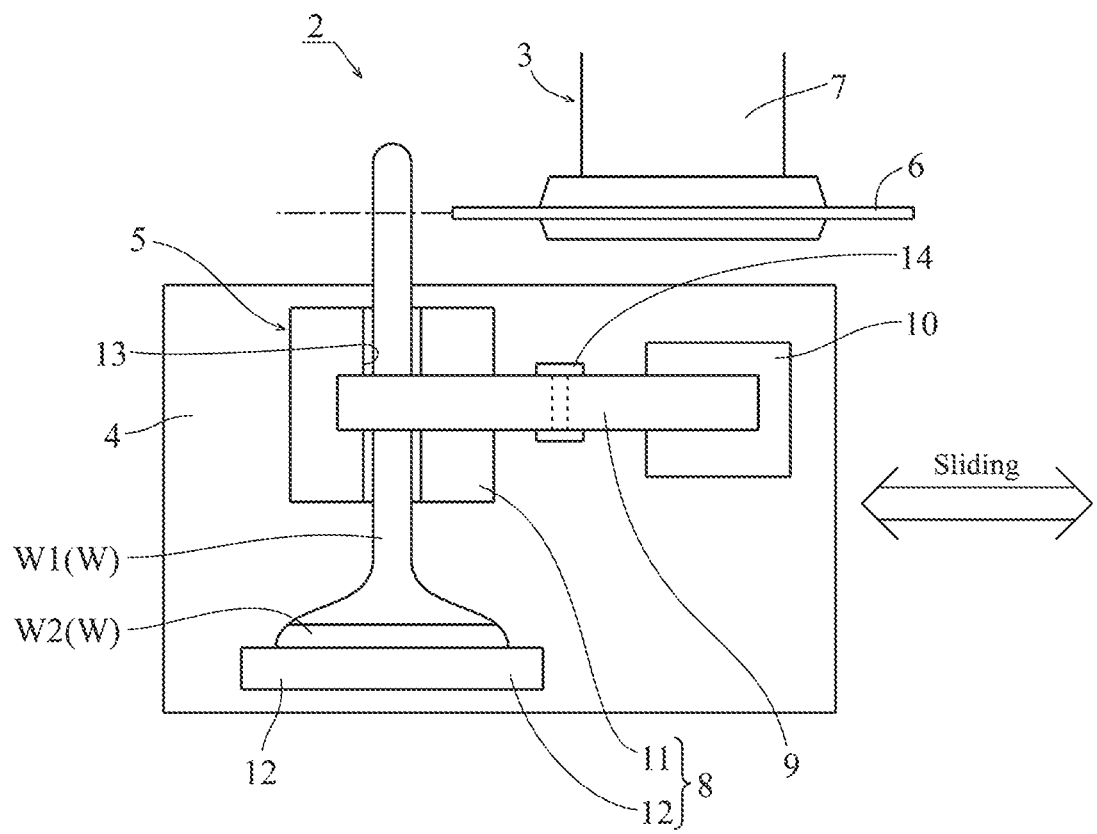
FIG. 3 is a plan view showing a cutting device according to the embodiment.
Figure 4:
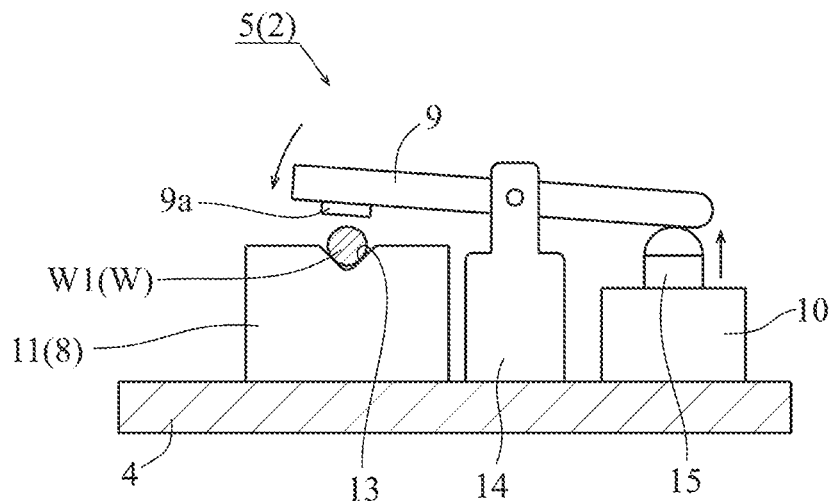
FIG. 4 is a partial cross-sectional front view showing the cutting device according to the embodiment.

The cutting process has a role of cutting the stem portion W1 of the workpiece W to be a predetermined length as shown in FIG. 2 in order to let the entire length of the workpiece W be the constant length L according to a type of workpiece W. Therefore, in the cutting process, a cutting device 2 is provided, and the cutting device 2 is, as is well known, equipped with a cutting tool 3, a slider 4 which is disposed so as to be adjacent to the cutting tool 3, and a workpiece W holding tool 5 which is disposed on the slider 4 as shown in FIGS. 3 and 4.

The cutting tool 3 is equipped with a discoid rotary blade 6, and a spindle device 7 which rotary-drives the rotary blade 6, and its cutting function is exerted by the rotary blade 6 rotary-driven by the spindle device 7.

The slider 4 is formed as a flat plate of a rectangular shape in a plan view. This slider 4 is made so as to be slidable in its longitudinal direction (the horizontal direction in FIG. 3), and the longitudinal direction is set to be perpendicular to the axis extension direction of the spindle device 7 in the cutting tool 3.

The workpiece holding tool 5 is equipped with a set mechanism 8 which positions the workpiece W, a presser tool 9 which presses the workpiece W against the set mechanism 8, and an air cylinder 10 which drives the presser tool 9.

The set mechanism 8 is equipped with a holding mounting 11 and a stopper 12 with a predetermined space in the width direction (the vertical direction in FIG. 3) of the slider 4 on one side (on the left side in FIGS. 3 and 4) in the longitudinal direction on the slider 4. The holding mounting 11 forms a groove-like acceptance recess 13 for accepting the stem portion W1 of the workpiece W in its upper surface, and the acceptance recess 13 extends in the width direction of the slider 4. The stopper 12 is disposed on the farther side than the holding mounting 11 with reference to the cutting tool 3, and at the time of setting the workpiece W in the set mechanism 8, the end face of the head portion W2 of the workpiece W held on the holding mounting 11 is brought into contact with the stopper 12. Thereby, the workpiece W is positioned on the basis of the stopper 12 in the extension direction of the workpiece W, and thereunder, the other end side portion (including the surplus portion) of the stem portion W1 of the workpiece W is extended to protrude externally in the width direction of the slider 4.

The presser tool 9 is supported rotatably by a supporting member 14 on the slider 4. The supporting member 14 is disposed so as to be adjacent to the holding mounting 11 on the internal side in the longitudinal direction of the slider 4, and the rotary axis of the supporting member 14 with respect to the presser tool 9 is oriented in the width direction of the slider 4. The presser tool 9 has an elongated shape, and substantially the central portion in the extension direction is supported rotatably by the supporting member 14. The acceptance recess 13 of the holding mounting 11 faces a moving region of one end of the presser tool 9 according to rotation of the presser tool 9, and the one end of the presser tool 9 is, as a presser portion 9a, capable of pressing the stem portion W1 of the workpiece W on the holding mounting 11.

The air cylinder 10 is disposed on the other side (on the right side in FIGS. 3 and 4) on the longitudinal direction of the slider 4. This air cylinder 10 is equipped with a telescopic rod 15 which makes a telescopic motion, and the telescopic rod 15 is disposed in the moving region of the other end of the presser tool 9. Therefore, when the telescopic rod 15 makes an extensional motion, the presser tool 9 is rotated centering on the rotary axis in the supporting member 14, and the presser portion 9a thereof moves toward the acceptance recess 13.

When the slider 4 is made to slide after the workpiece W is set by use of the workpiece holding tool 5 under the cutting device 2, the other end of the stem portion W1 of the workpiece W is cut by the rotary blade 6 of the cutting tool 3, and the entire length of the workpiece W becomes the constant length L (refer to FIG. 2). At this time, as shown in FIG. 2, a burr 16 is formed on the cut end face rim portion of the stem portion W1 in this workpiece W.

Figure 5:
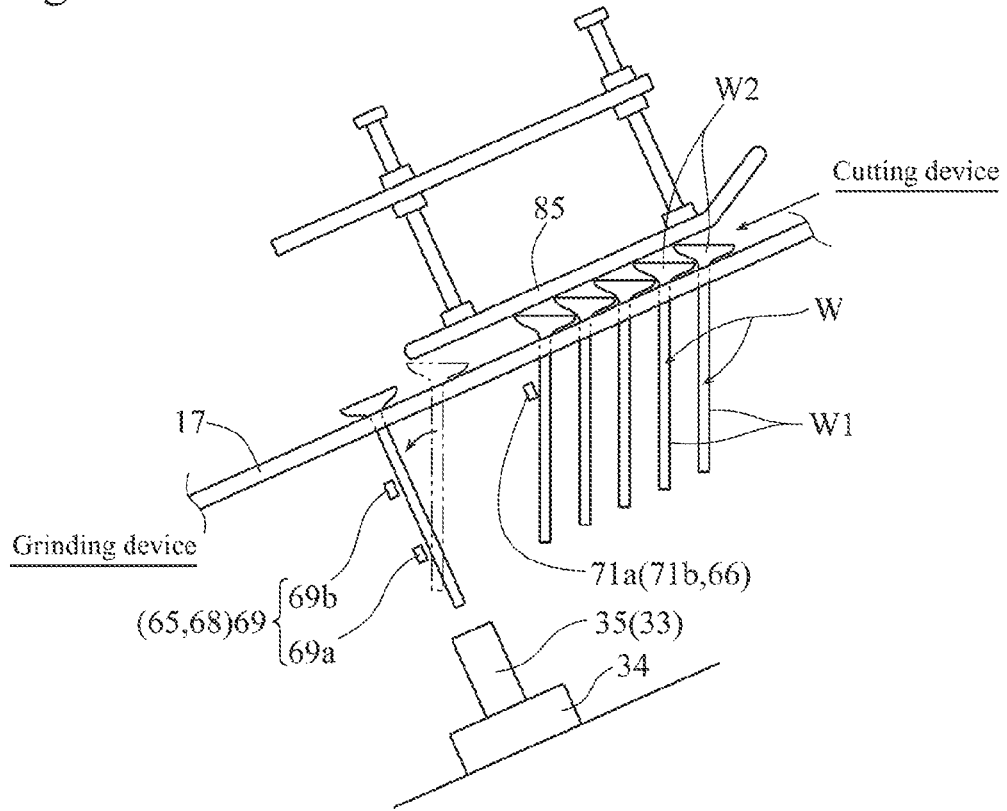
FIG. 5 is a side view for explanation of a state of a workpiece carried by a pair of guide rails.
Figure 6:
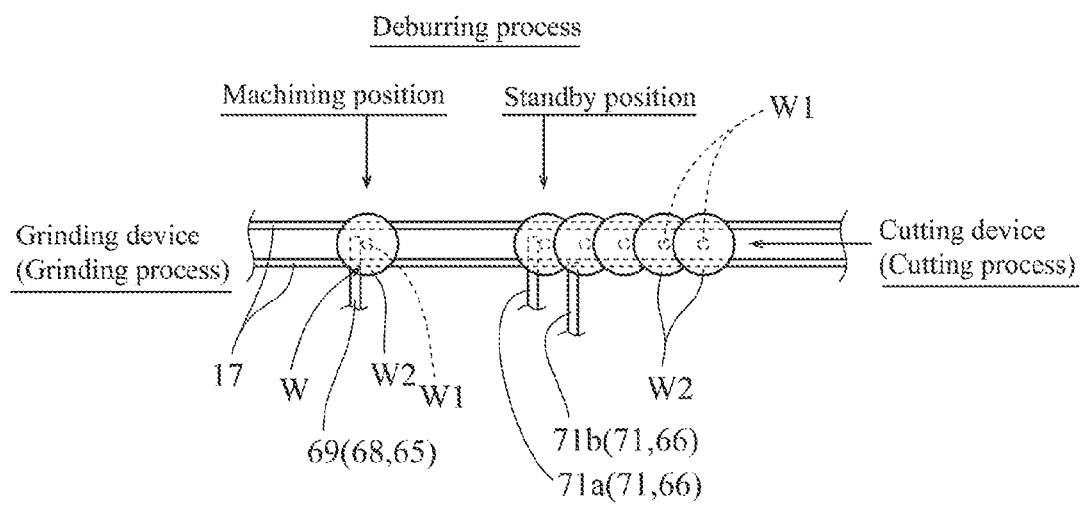
FIG. 6 is a plan view for explanation of a state of a workpiece carried by the pair of guide rails.

The workpiece W finished with machining processing in the cutting device 2 is carried sequentially to the deburring process and the grinding process by use of a pair of guide rails (commonly known as "chute") 17 serving as a pair of carrier members (carrier means) as shown in FIGS. 5 and 6. The pair of guide rails 17 are extended with a constant space, and the pair of guide rails 17 are tilted so that its height position becomes higher as it goes toward the workpiece W carry-in side (the cutting device 2 side). At the time of carrying the workpiece W by use of the pair of guide rails 17, the head portion W2 of the workpiece W is made to stride over the pair of guide rails 17, and the stem portion W1 of the workpiece W is suspended downward from between the pair of guide rails 17. Thereby, the workpiece W slides on the pair of guide rails 17 under its own weight of the workpiece W under the tilt of the pair of guide rails 17, to be carried to the deburring process and the grinding process.

At this time, because the pair of guide rails 17 are tilted, meanwhile, the stem portion W1 of the workpiece W intends to take a posture extending toward the vertical direction, the front side portion (the carry-in side portion) of the head portion W2 of the workpiece W takes a posture of slightly floating from the pair of guide rails 17.

In addition, in FIG. 5, reference numeral 85 is a guide member which restricts the workpiece W carried by the pair of guide rails 17 from bouncing up.

The deburring process has a role of eliminating the burr 16 generated on the cut end face rim portion of the stem portion W1 of the workpiece W in the cutting process. This deburring process is provided by utilizing a carrying space between the previous cutting process and grinding process, and the carrying distance between the cutting process and the grinding process is not increased, and the pair of guide rails 17 are not changed due to this deburring process being provided.

The above-described deburring process has a deburring device 18 as shown in FIGS. 7 to 13 in order to function in the above-described role.

This deburring device 18 is equipped with a pair of right and left supporting columns 20 and an attachment substrate 21 on a foundation 19 having a rectangular shape in a plan view. The foundation 19 is provided on a floor surface 23 via leg portions 22 respectively provided on the respective corners of the rectangular shape in a plan view. The respective leg portions 22 are adjustable in height positions of the respective corners of the foundation 19, and it is possible to adjust the height of the foundation 19 from the floor surface 23 by adjusting the respective leg portions 22.

The pair of right and left supporting columns 20 are installed upright on the both sides in the width direction (the vertical direction in FIG. 9) of the foundation 19, and positioning fixed plates 24 are respectively attached at predetermined height positions to the respective supporting columns 20 so as to extend in the longitudinal direction (the horizontal direction in FIG. 9) of the foundation 19. Circular arc shaped guide holes 24a are formed in the respective positioning fixed plates 24 (refer to FIG. 10).

The attachment substrate 21 is formed as a long plate material, and the attachment substrate 21 is disposed in a state in which its plate surface stands upright so as to face in the longitudinal direction of the foundation 19 between the pair of right and left supporting columns 20. A support shaft 25 is attached to the lower portion of the attachment substrate 21 so as to extend in the width direction (the horizontal direction in FIG. 7) of the attachment substrate, and the both ends of the support shaft 25 are supported rotatably by the foundation 19 via shaft bearings 26. On the other hand, attachment plates 27 are attached to the both side portions on the upper side of the attachment substrate 21, and screw holes 29 for screwing braces 28 together are formed in the attachment plates 27. The screw holes 29 are in a disposition relationship of facing the guide holes 24a of the positioning fixed plates 24 regardless of a tilting motion of the attachment substrate 21, and it is possible to adjust a tilted state of the attachment substrate 21 by attaching the braces 28 into the screw holes via the guide holes 24a.

Figure 7:
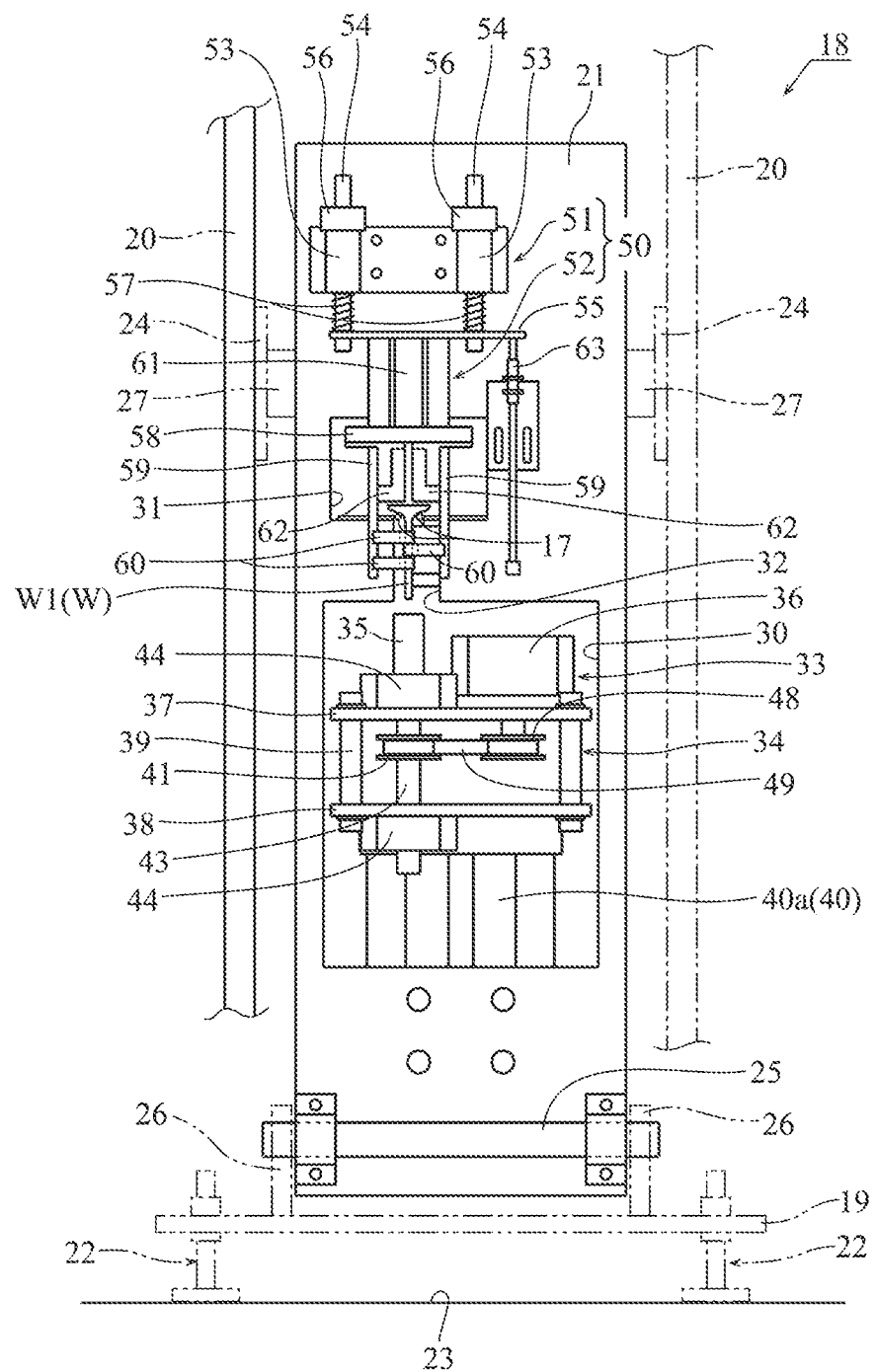
FIG. 7 is a front view showing a deburring device according to the embodiment.
Figure 8:
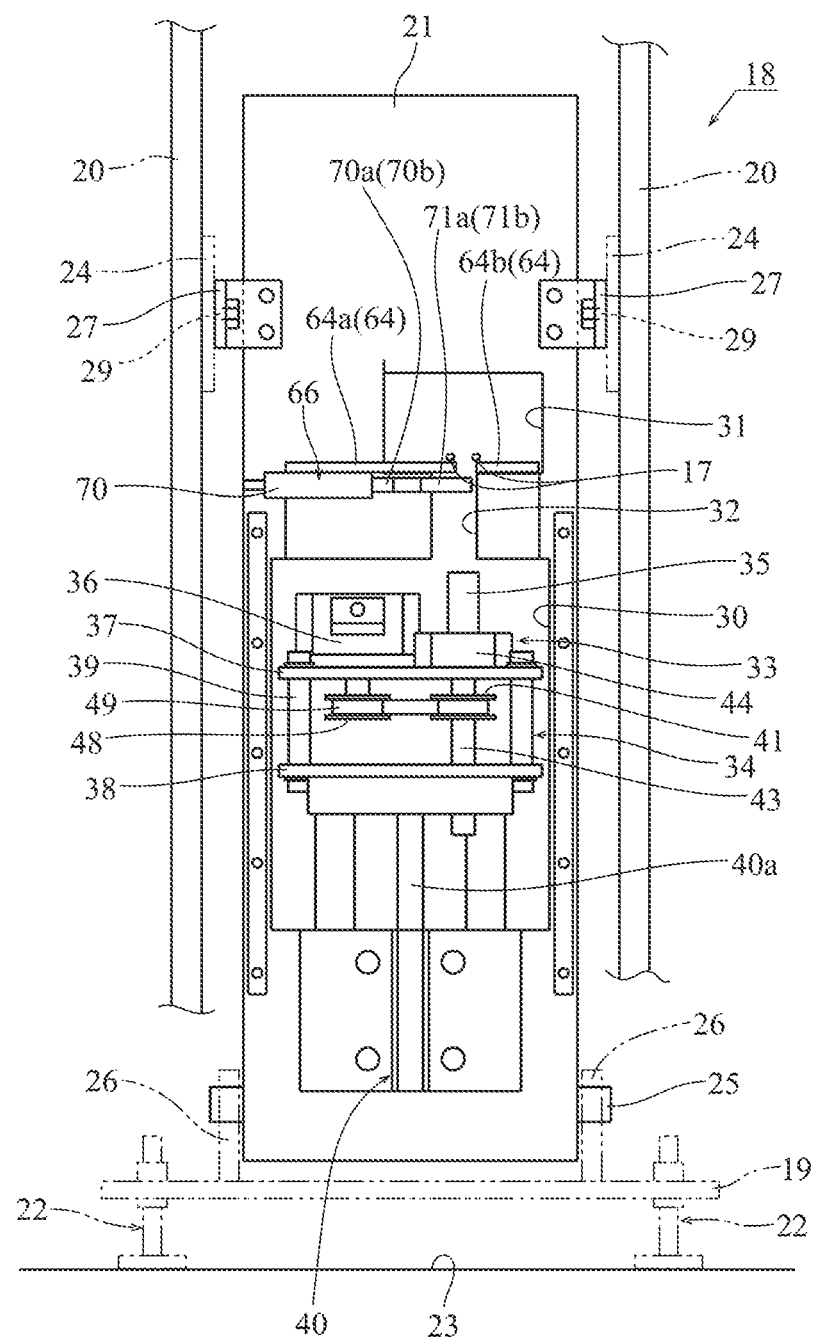
FIG. 8 is a rear view showing the deburring device according to the embodiment.
Figure 10:
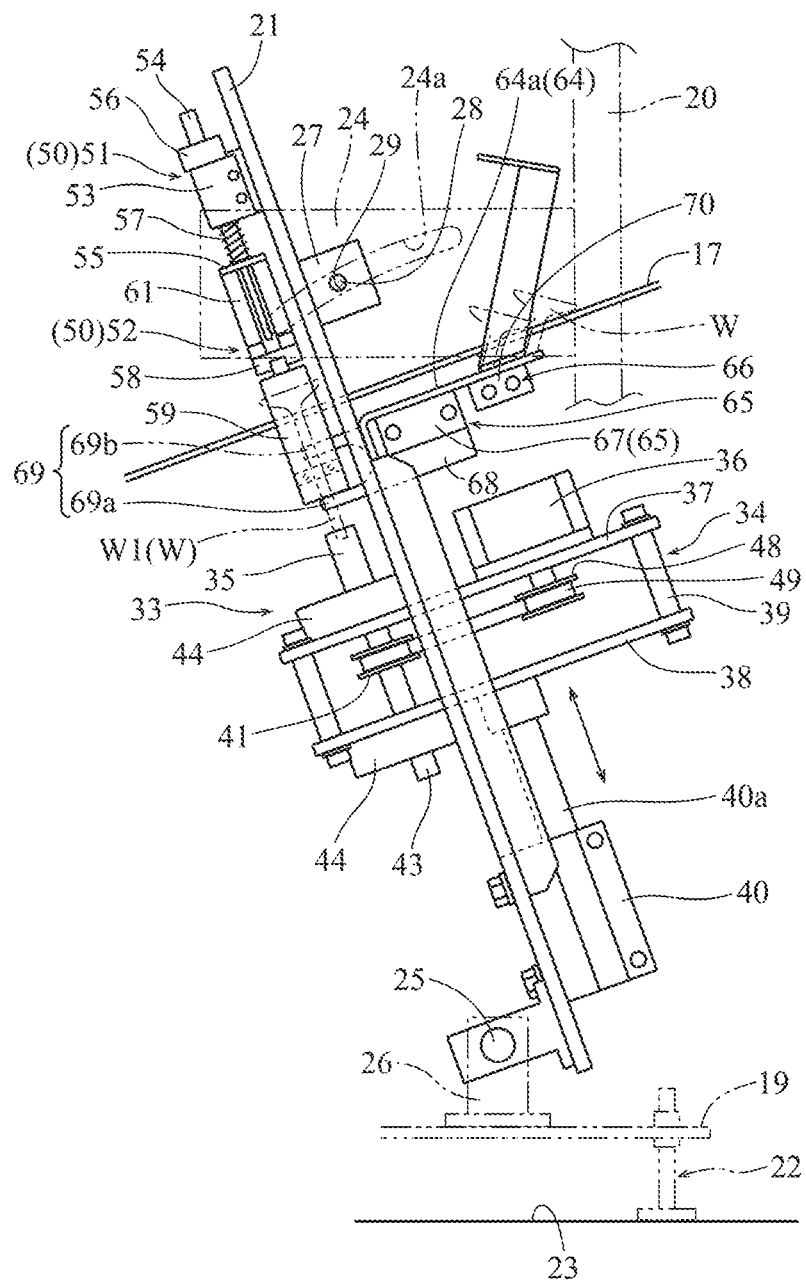
FIG. 10 is a side view showing a state in which an attachment substrate of the deburring device according to the embodiment is tilted according to the pair of guide rails.
Figure 12:
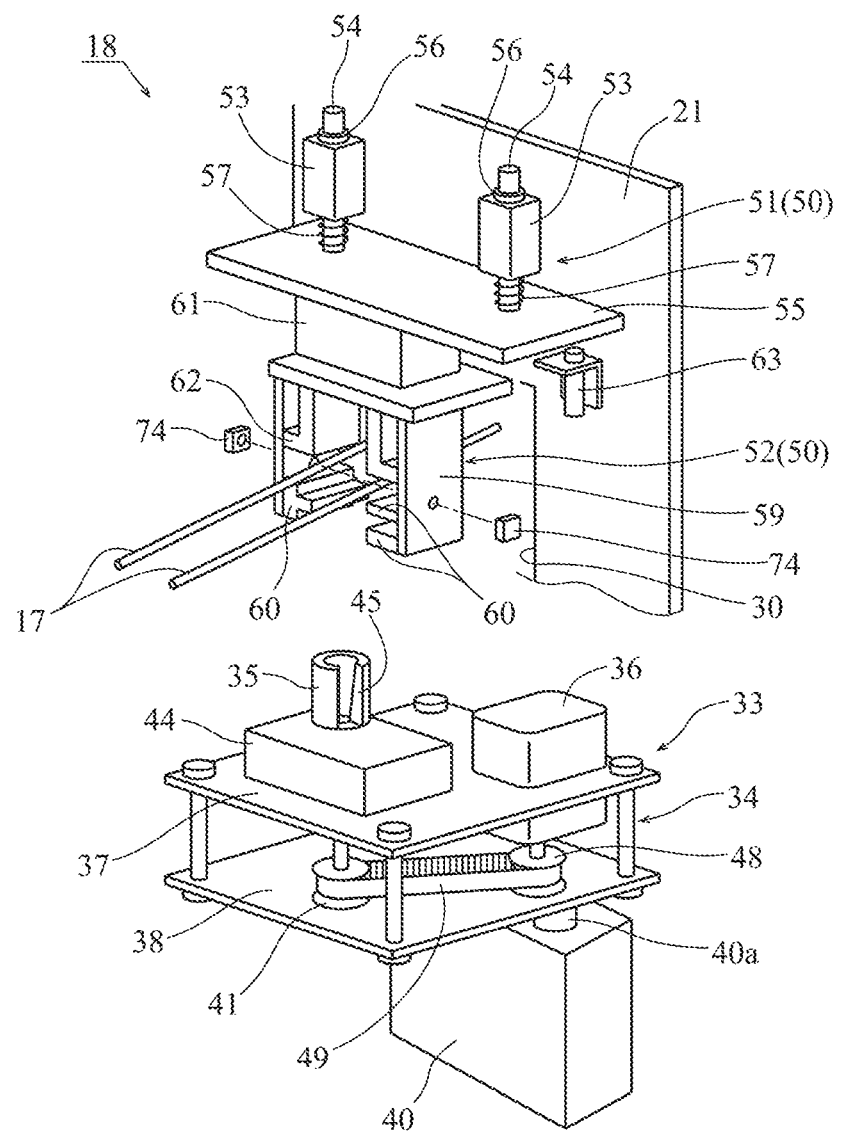
FIG. 12 is a simplified perspective view showing the deburring device according to the embodiment.

As shown in FIGS. 7, 8, and 12, this attachment substrate 21 has a first through-hole 30 of a rectangular shape which is formed to be relatively large on the lower side from the center in the longitudinal direction (the vertical direction in FIGS. 7 and 8), a second through-hole 31 which is made smaller than the first through-hole 30 on the upper side of the first through-hole 30, and a strip-shaped third through-hole 32 which makes the first and second through-holes 30 and 31 be in communication with each other up and down. This attachment substrate 21 is disposed so that the pair of guide rails 17 pass through the second through-hole 31 at the time of disposing the deburring device 18 between the cutting process (the cutting device 2) and the grinding process (the grinding device), and the tilted state of the attachment substrate 21 is adjusted so that the plate surface of the attachment substrate 21 is perpendicular to the pair of guide rails 17 as shown in FIG. 10 by utilizing the guide holes 24a of the positioning fixed plates 24, the screw holes 29 in the attachment plates 27, the braces 28, and the like.

Figure 9:
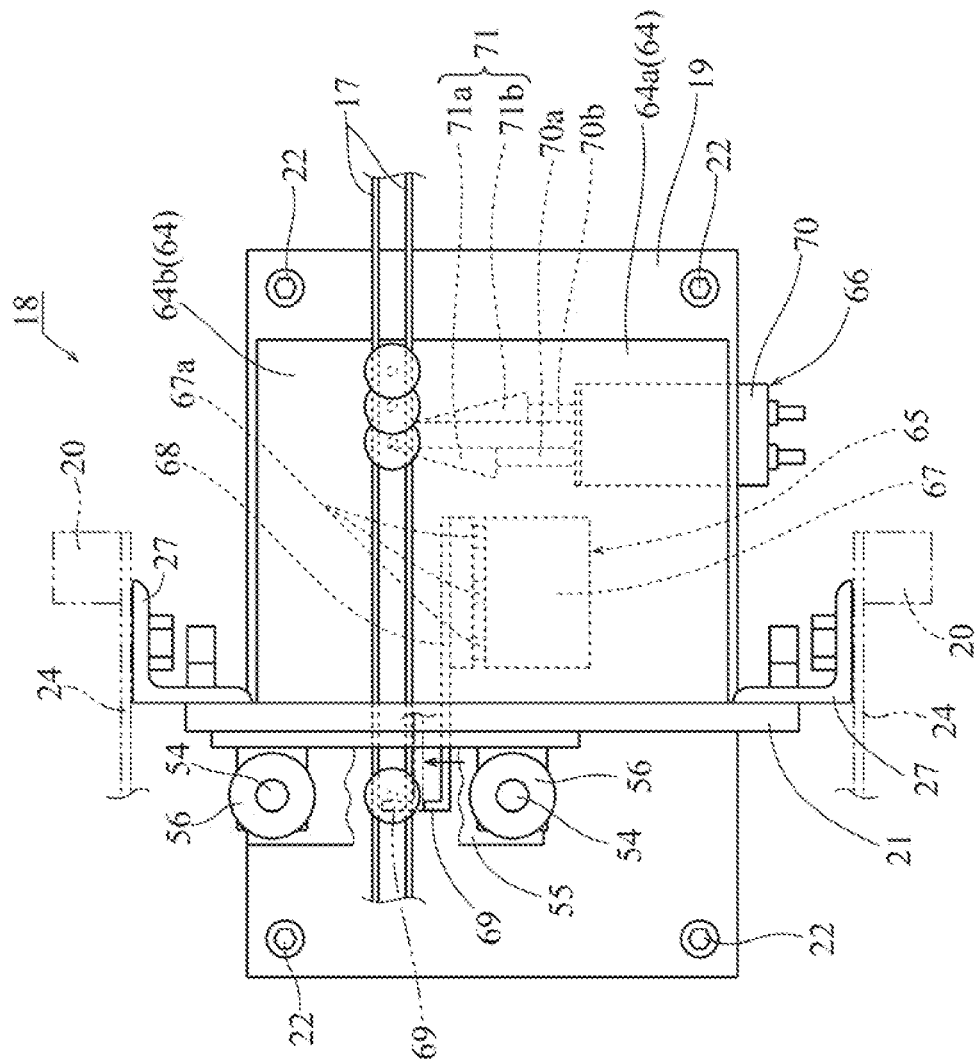
FIG. 9 is an enlarged plan view showing the deburring device according to the embodiment.

In addition, with respect to FIGS. 7 to 9, as a matter of convenience of illustration, the attachment substrate 21 is made to stand so as to be perpendicular to the substrate 9.

The deburring device 18 is, as shown in FIGS. 5, 6, and 8 to 10, equipped with first and second stopper devices 65 and 66 on the rear surface side (on the workpiece carry-in side) of the attachment substrate 21.

As shown in FIGS. 8 and 9, a table 64 is attached to the rear surface of the attachment substrate 21 so as to be pendent, and the table 64 is disposed so that the plate surface faces in the longitudinal direction of the attachment substrate 21 in the vicinity of the lower edge of the second through-hole 31. In the present embodiment, as the table 64, a first table 64a and a second table 64b are provided so as to sandwich the third through-hole 32 therebetween (refer to FIG. 8), and a first stopper device 65 and a second stopper device 66 are attached, in order in a direction spaced from the rear surface of the attachment substrate 21, to the bottom surface of the first table 64a.

As shown in FIGS. 5, 6, 9, and 10, the first stopper device 65 is equipped with a first stopper driving device 67 attached to the bottom surface of the first table 64a, and a first stopper 68 driven by the first stopper driving device 67. The first stopper driving device 67 is composed of a cylinder driving device equipped with a telescopic rod 67a which makes a telescopic motion, and a telescopic direction of the telescopic rod 67a is oriented in the width direction of the attachment substrate 21. The first stopper 68 extends along the pair of guide rails 17 on the lower side from the pair of guide rails 17, and one end of the first stopper 68 is coupled to the telescopic rod 67a of the first stopper driving device 67, and the other end thereof extends up to a predetermined machining position. A stopper claw 69 is provided on the pair of guide rails 17 so as to protrude, and the stopper claw 69 advances between the pair of guide rails 17 (in a state in which the stopper claw 69 crosses between the pair of guide rails 17) when the telescopic rod 67a is elongated, and exits from between the pair of guide rails 17 when the telescopic rod 67a is shortened. Thereby, when the stopper claw 69 crosses between the pair of guide rails 17, the stopper claw 69 accepts the stem portion W1 of the workpiece W which is carried by the pair of guide rails 17, and when the stopper claw 69 exits from that state, the stopper claw 69 carries out the workpiece W accepted at that time.

In this case, in the present embodiment, the stopper claw 69 has a pair of claw portions 69a and 69b as shown in FIGS. 5 and 10, and the pair of claw portions 69a and 69b are disposed with a space in the longitudinal direction (in the vertical direction in FIG. 10) of the attachment substrate 21. Therefore, when the stopper claw 69 accepts the stem portion W1 of the workpiece W, as shown in FIG. 5, first, the lower claw portion 69a between the pair of claw portions 69a and 69b comes into contact with the stem portion W1 of the workpiece W, and the head portion W2 side of the workpiece W rotates centering on the lower claw portion 69a to the carry-out side of the workpiece W, and the stem portion W1 comes into contact with the upper claw portion 69b between the pair of claw portions 69a and 69b according to this rotation, and further, the front side portion (the carry-out side portion) of the head portion W2 comes into contact with the pair of guide rails 17. Thereby, the workpiece W is positioned so as to be in a state in which the stem portion W1 is substantially perpendicular to the pair of guide rails 17 in a state of being immediately stabilized by the three contact points.

As shown in FIGS. 5, 6, and 8 to 10, the second stopper device 66 is equipped with a second stopper driving device 70 which is attached to the bottom surface of the first table 64a, and a second stopper 71 which is driven by the second stopper driving device 70.

The second stopper driving device 70 is equipped with a pair of telescopic rods 70a and 70b making a telescopic motion, and the pair of telescopic rods 70a and 70b are installed adjacent to one another in the extension direction (the horizontal direction in FIG. 9) of the pair of guide rails 17 so that the telescopic direction of the both telescopic rods is oriented in the width direction (the vertical direction in FIG. 9) of the foundation 21 at a lower position from the pair of guide rails 17. The pair of telescopic rods 70a and 70b are set so that, when the one telescopic rod 70a is in an elongated state, the other telescopic rod 70b is in a shortened state, and when the other telescopic rod 70b is in an elongated state, the one telescopic rod 70a is in a shortened state.

The second stopper 71 has a pair of stopper claws 71a and 71b so as to correspond to the pair of telescopic rods 70a and 70b, and the one stopper claw 71a is coupled to the one telescopic rod 70a, and the other stopper claw 71b is coupled to the other telescopic rod 70b. Thereby, when the one telescopic rod 70a is in an elongated state and the other telescopic rod 70b is in a shortened state, the one stopper claw 71a enters between the pair of guide rails 17, and the other stopper claw 71b exits from between the pair of guide rails 17 (refer to FIGS. 6 and 9), and when the other telescopic rod 70b is in an elongated state and the one telescopic rod 70a is in a shortened state, the other stopper claw 71b enters into between the pair of guide rails 17, and the one stopper claw 71a exits from between the pair of guide rails 17. Therefore, when the pair of stopper claws 71a and 71b perform a switching operation, only the front workpiece W among the workpieces W restricted from being carried in up to that time is moved to a machining position.

The deburring device 18 is equipped with a deburring unit 33 as shown in FIGS. 7, 8, 10, and 12. The deburring unit 33 is disposed so as to come across the first through-hole 30 in the attachment substrate 21, and the deburring unit 33 is equipped with a moving base body 34, a deburring tool 35 which is provided on the moving base body 34, and a driving motor 36 which rotary-drives the deburring tool 35.

With respect to the moving base body 34, in the present embodiment, an upper panel 37 and a lower panel 38 which is disposed parallel with a space on the lower side from the upper panel 37 are coupled to one another by use of a coupling tool 39, and the moving base body 34 (the upper panel 37 and the lower panel 38) comes across so as to be orthogonal to the attachment substrate 21. A driving cylinder device 40 (driving device for the deburring tool) is coupled to this moving base body 34 (the lower panel 38) via its telescopic rod 40a, and the driving cylinder device 40 is attached to the rear surface of the attachment substrate 21 at the lower portion of the attachment substrate 21. Thereby, causing the moving base body 34 to move up and down due to a telescopic motion of the telescopic rod 40a in the first through-hole 30. In this case, the telescopic direction of the telescopic rod 40a is set to the longitudinal direction of the attachment substrate 21.

The deburring tool 35 is formed into a cylindrical body having a recess 42 (a circular opening in a plan view) for insertion of the stem portion W1 of the workpiece W as shown in FIGS. 5, 7, 8, and 10 to 12. This deburring tool 35 is coupled to a transmission shaft 43 passing through the upper and lower panels 37 and 38, and the transmission shaft 43 is supported rotatably by a shaft bearing 44 respectively fixed to the upper and lower panels 37 and 38. A pulley 41 is attached to this transmission shaft 43 between the upper panel 37 and the lower panel 38.

Figure 11:
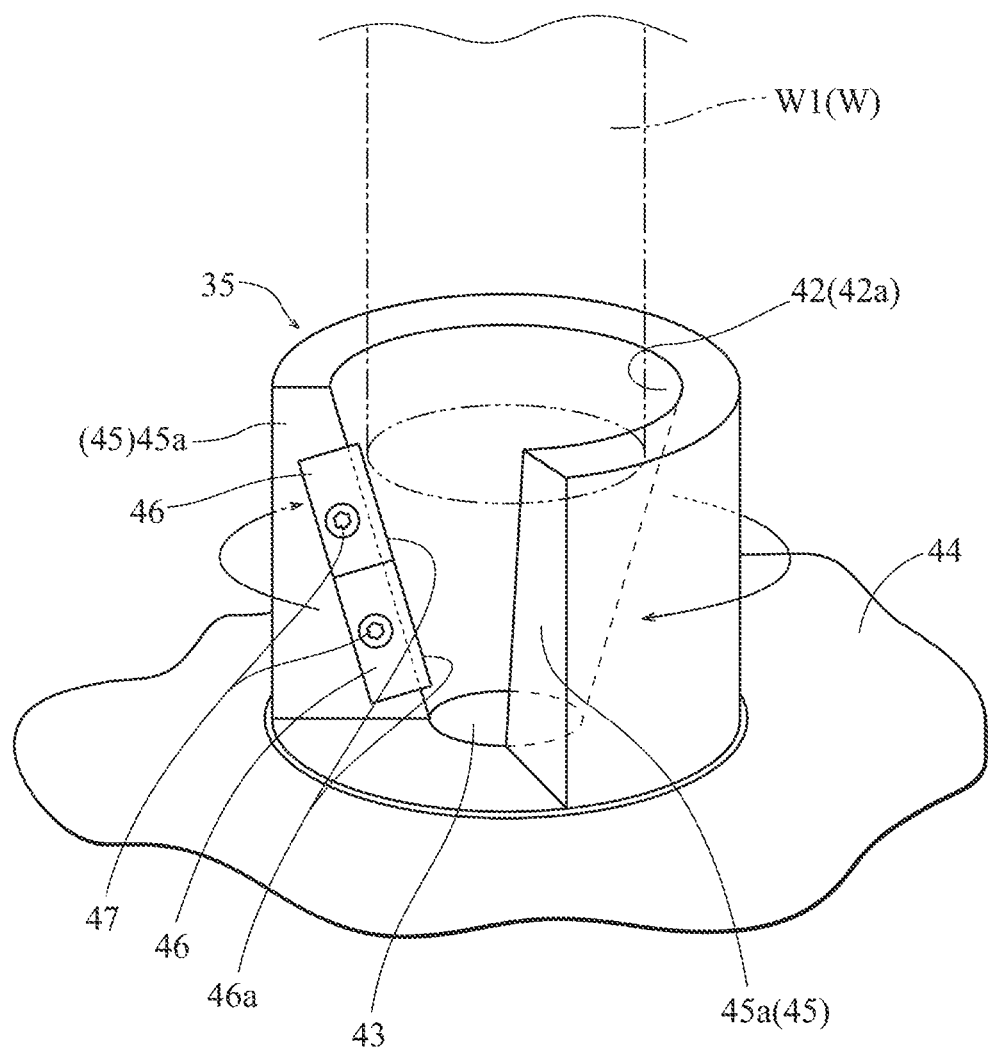
FIG. 11 is an enlarged perspective view showing a deburring tool according to the embodiment.

An inner circumferential surface 42a of the recess 42 in the deburring tool 35 is, as shown in FIG. 11, formed so that the inner diameter of the recess 42 partitioned by the inner circumferential surface 42a of the recess is reduced as it goes from the recess 42 opening side toward the recess 42 internal side (on the lower side in FIG. 11). A notch 45 is formed in the deburring tool 35 so as to extend in the axis direction of the deburring tool 35, and a blade tool 46 is attached to a notched end face 45a of the notch 45 so as to be detachable from a brace 47. This blade tool 46 is disposed so that a blade portion 46a (a deburring machining section) extends in the depth direction of the recess 42 along the inner circumferential surface 42a of the recess, and as this blade tool 46, a cutting tool which is worn out may be reused for another cutting instrument.

The driving motor 36 is, as shown in FIGS. 7, 8, 10, and 12, attached to the upper surface of the upper panel 37 of the moving base body 34 further on the carry-in side of the workpiece W than the attachment substrate 21. An output shaft 36a of the driving motor 36 passes through the upper panel 37 to extend between the upper panel 37 and the lower panel 38, and a pulley 48 is attached to the output shaft 36a. A belt 49 is extended between the pulley 48 and the pulley 41 of the transmission shaft 43, and rotary-driving force of the driving motor 36 is transmitted to the deburring tool 35 via the transmission shaft 43.

The deburring device 18 is equipped with a holding device 50 as shown in FIGS. 7, 9, 10 and 12. The holding device 50 is attached to the front surface (the workpiece carry-out side) of the attachment substrate 21 on the upper side of the deburring unit 33, and the holding device 50 is equipped with a supporting device 51 attached to the attachment substrate 21 and a chuck device 52 attached to the lower portion of the supporting device 51.

The supporting device 51 is equipped with a pair of shaft bearings 53, a pair of supporting rods 54, and an attachment plate 55. The pair of shaft bearings 53 are fixed to the upper portion of the attachment substrate 21, and the pair of shaft bearings 53 are installed adjacent to one another with a space in the width direction of the attachment substrate 21. The pair of supporting rods 54 are supported by the respective shaft bearings 53 so as to be slidable in the longitudinal direction of the attachment substrate 21, and stoppers 56 are respectively attached to the upper ends of the respective supporting rods 54 so as not to drop the respective supporting rods 54. The attachment plate 55 is coupled to the bottom ends of the pair of supporting rods 54 so that its plate surface faces in the longitudinal direction of the attachment substrate 21, and coil springs 57 serving as biasing means are mounted between the attachment plate 55 and the respective shaft bearings 53 in order to bias in a direction in which the respective stoppers 56 come into contact with the respective shaft bearings 53.

The chuck device 52 is equipped with a guide plate 58, a pair of moving boards 59, a pair of pinching members 60, and a driving device 61.

The guide plate 58 is disposed so as to face the attachment plate 55 on the lower side of the attachment plate 55 and at the upper portion of the second through-hole 31, and the bottom surface of the guide plate 58 serves as a guiding surface for guiding the pair of moving boards 59.

The pair of moving boards 59 are held so as to be slidable by the guide plate 58. The pair of moving boards 59 are suspended from the guiding surface of the guide plate 58 so that the both board surfaces face each other so as to be oriented in the width direction (the horizontal direction in FIG. 7) of the attachment substrate 21 further on the workpiece W carry-out side than the second and third through-holes 31 and 32, and the internal surfaces of the pair of moving boards 59 are guided by the guide plate 58 to be capable of making approaching and spacing motions from each other on the outer side in the parallel-installed direction of the pair of guide rails 17.

The pair of pinching members 60 are respectively provided so as to protrude into the internal surfaces of the pair of respective moving boards 59, and the pair of pinching members 60 have a function of pinching the stem portion W1 of the workpiece W supported by the pair of guide rails 17 on the lower side of the pair of guide rails 17 on the basis of an approaching motion of the pair of moving boards 59. Therefore, when the stem portion W1 of the workpiece W is pinched by the pair of pinching members 60, the workpiece W is restricted from being carried, and the stem portion W1 of the workpiece W is restricted from relatively rotating and moving in the longitudinal direction of the attachment substrate 21.

In the present embodiment, one pinching members 60 is provided on one of the moving boards 59, and a recess for accepting the stem portion W1 of the workpiece W is formed in its tip end face, and two pinching members 60 positioned above and below the pinching member 60 on the one moving board 59 at the time of pinching the stem portion W1 of the workpiece W are provided on the other moving board 59, and recesses for accepting the stem portion W1 of the workpiece W are formed in the tip end faces of the both pinching members 60. Further, workpiece acceptance members 62 are respectively attached to the inner surfaces of the respective moving boards 59 on the upper side of the pair of pinching members 60 so as to correspond to the pair of pinching members 60, and when the pair of moving boards 59 (the pair of pinching members 60) make an approaching motion, an acceptance surface for accepting the end face of the head portion W2 of the workpiece W is composed by the pair of workpiece acceptance members 62 on the upper side of the pair of pinching members 60.

The driving device 61 is interposed between the attachment plate 55 and the guide plate 58, to couple the attachment plate 55 and the guide plate 58. This driving device 61 is to apply driving force to the pair of moving boards 59 for making approaching and spacing motions, and the pair of pinching members 60 perform chucking or release chucking of the stem portion W1 of the workpiece W by applying the driving force.

Figure 14:
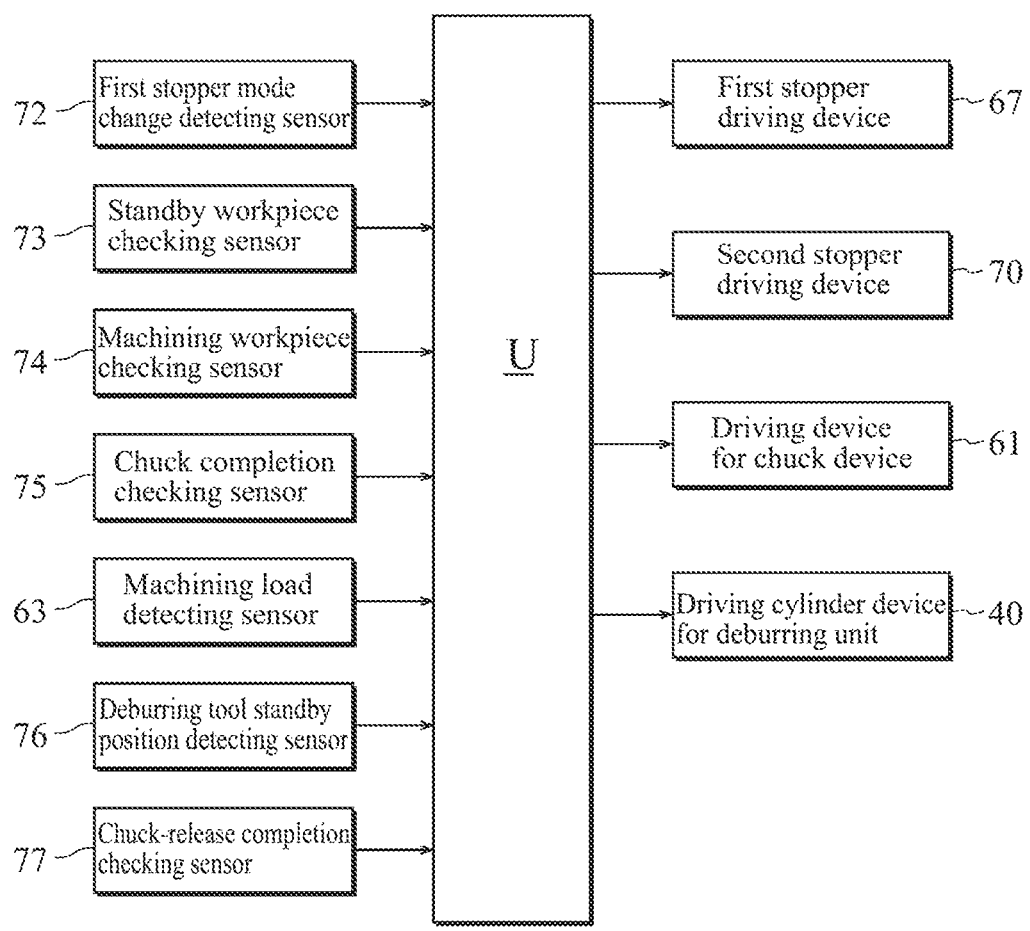
FIG. 14 is a diagram showing the input-output relationship with respect to a control unit in the deburring device according to the embodiment.

As shown in FIGS. 7, 12, and 14, a machining load detecting sensor 63 serving as a displacement motion detecting sensor is disposed under the attachment plate 55 at the front surface of the attachment substrate 21. The machining load detecting sensor 63 is set so as to come into contact with the bottom surface of the attachment plate 55 when external force for moving it upward is not applied. When the machining load detecting sensor 63 is in contact with the attachment plate 55, an ON signal is output from the machining load detecting sensor 63, and when the contact relationship of the machining load detecting sensor 63 with the attachment plate 55 is released, an OFF signal is output from the machining load detecting sensor 63.

As shown in FIG. 14, a control unit U is provided on the deburring device 18 in order to control the respective first stopper driving devices 67 and 70 of the first and second stopper devices 65 and 66, the driving device 61 of the chuck device 52, and the driving cylinder device 40 of the deburring unit 33. Therefore, ON (when the first stopper 68 is changed to an advanced state) and OFF (when the first stopper 68 is changed to an exit state) signals from a first stopper mode change detecting sensor 72, ON (a state of the workpiece W being at the second stopper 71 position (standby position)) and OFF (a state of the workpiece W not being at the second stopper 71 position (standby position)) signals from a standby workpiece checking sensor 73, ON (a state of the workpiece W being at the first stopper 68 position (machining position)) and OFF (a state of the workpiece W not being at the first stopper 68 position (machining position)) signals from a machining workpiece checking sensor 74, ON (a chucking completion state of the stem portion W1 of the workpiece W) and OFF (a chucking uncompleted state of the stem portion W1 of the workpiece W) signals from a chuck completion checking sensor 75, ON (a loading state less than or equal to predetermined load) and OFF (a loading state over the predetermined load) signals from the machining load detecting sensor 63, ON (a state in which the deburring tool 35 is positioned at the standby position) and OFF (a state in which the deburring tool 35 is not positioned at the standby position) signals from a deburring tool standby position detecting sensor 76, and ON (a state in which chuck-release of the stem portion W1 of the workpiece W is completed) and OFF (a state in which chuck-release of the stem portion W1 of the workpiece W is uncompleted) signals from a chuck-release completion checking sensor 77 are respectively input to the control unit U.

The control by the control unit U in this deburring device 18 is generally performed as follows.

Figure 13:
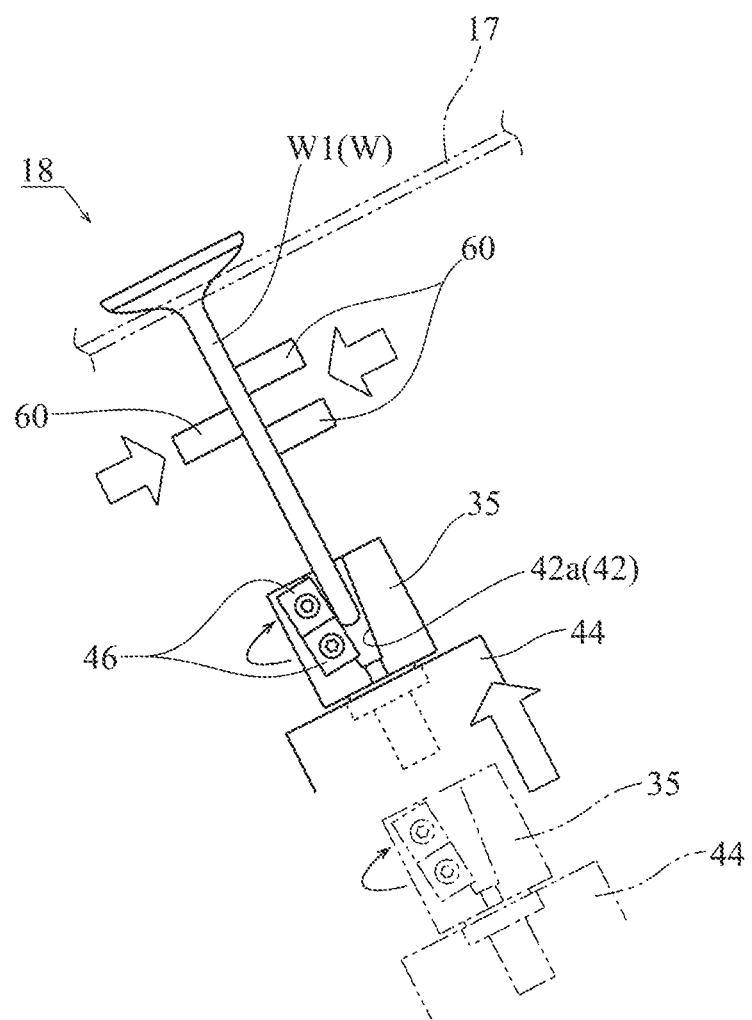
FIG. 13 is an explanatory diagram for explanation of actuation of the deburring device according to the embodiment.

The workpieces W finished with a cutting process in the cutting device 2 are carried to the grinding process by use of the pair of guide rails 17. However, along the way, those are stopped to be carried by the second stopper device 66. Only one of the workpieces W stopped to be carried by the second stopper device 66 is carried toward the first stopper device 65 by a switching operation of the second stopper device 66, and the workpiece as a machining workpiece to be machined is stopped to be carried by the first stopper device. When the machining workpiece is stopped to be carried by the first stopper device 65, as shown in FIG. 13, the pair of pinching members 60 of the chuck device 52 pinch the stem portion W1 of the workpiece W, and the other end of the stem portion W1 of the workpiece W pinched by the pair of pinching members 60 enters into the recess 42 of the deburring tool 35 due to the deburring tool 35 moving up. Thereby, gradually eliminating the burr 16 on the other end face rim portion of the stem portion W1 of the workpiece W by the blade portion 46*a* of the blade tool 46 according to the deburring tool 35 moving up.

Therefore, it is possible to eliminate the burr 16 on the stem portion W1 of the workpiece W in the deburring process provided by effectively utilizing the carrying space between the grinding process and the cutting process, and it is possible to prevent abnormal wear from being generated in a rubbing stone in the grinding process by eliminating the burr 16 on the stem portion W1 of the workpiece W in that deburring process. In addition, in this case, because the inner circumferential surface 42*a* of the recess in the deburring tool 35 is formed so that the inner diameter of the recess 42 partitioned by the inner circumferential surface 42*a* of the recess is reduced as it goes from the recess 42 opening side toward the recess internal side, and the blade portion 46*a* of the blade tool 46 is provided on the inner circumferential surface 42*a* of the recess, the blade portion 46*a* of the blade tool 46 gradually eliminates the burr 16 so as to change its touching areas with the burr 16 according to the deburring tool 35 moving up. Therefore, the blade portion 46*a* of the blade tool 46 does not eliminate the burr 16 with only a specific area, which makes it possible to suppress shortening of the life of the blade tool 46.

When deburring with respect to the stem portion W1 of a workpiece is performed by a given amount (given load), the deburring tool 35 starts moving down (a mode for stopping deburring machining), and in wait for the deburring tool 35 arriving at the standby position, the pair of pinching members 60 release the pinching of the stem portion W1 of the workpiece, and the workpiece W is carried out to the grinding process. When the workpiece W is carried out, the first stopper 68 of the first stopper device 65 comes into an entered (advancing) state in order to accept the following workpiece W at the machining position.

Figure 15:
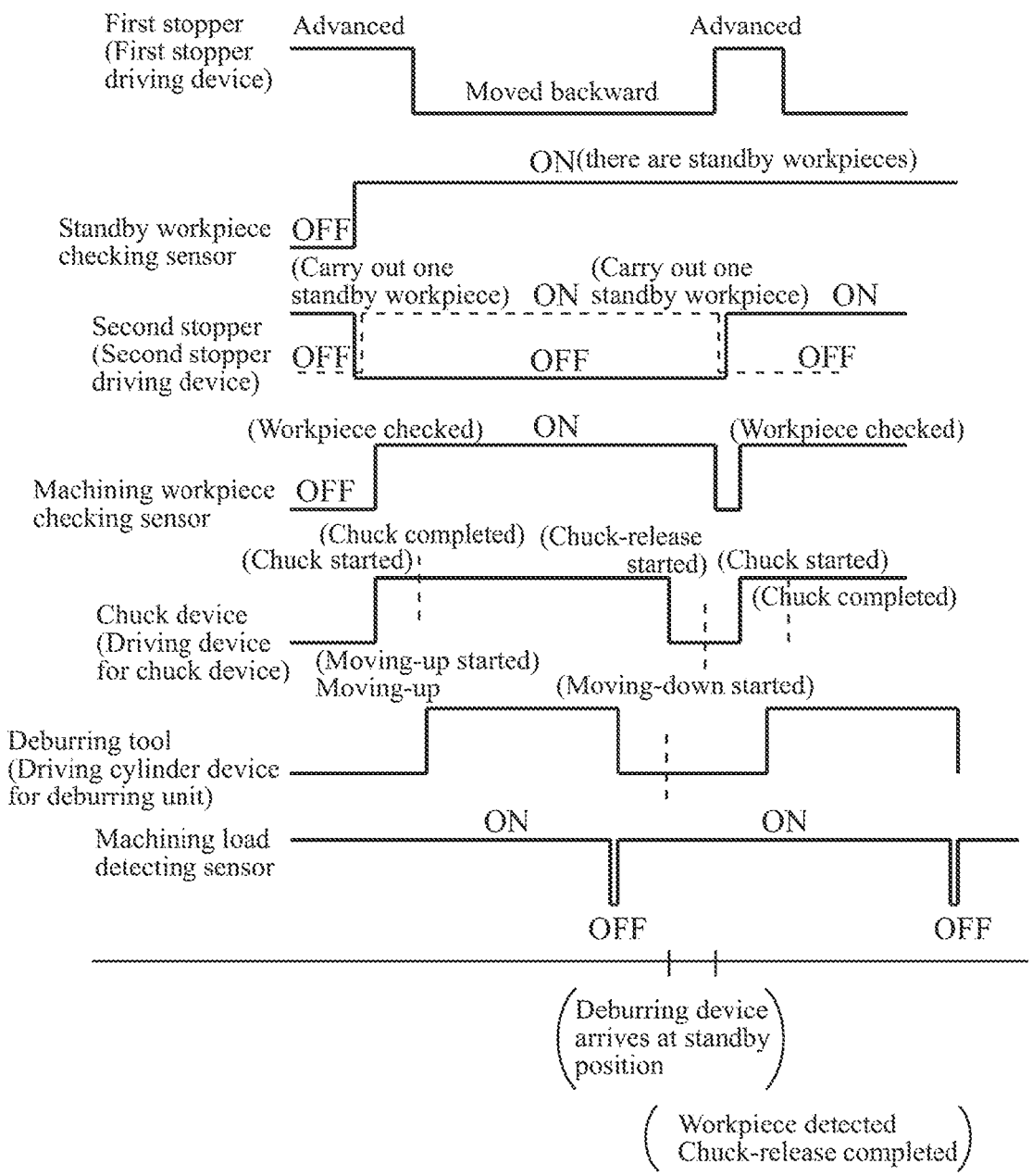
FIG. 15 is a time chart showing the actuation of the deburring device according to the embodiment.
Figure 16:
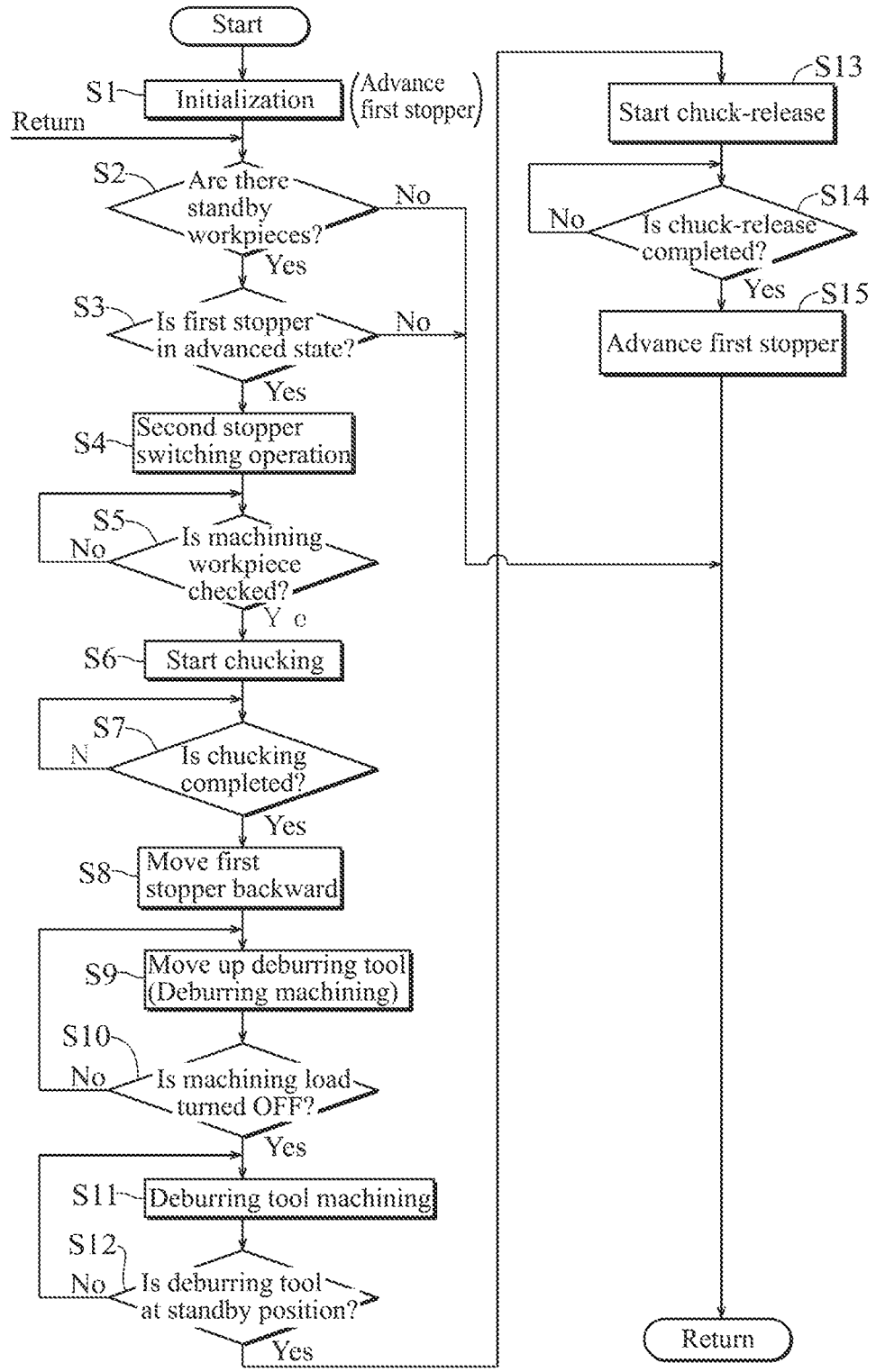
FIG. 16 is a flowchart showing a control example of the deburring device according to the embodiment.

The control contents of the control unit U will be described in detail along with the action of the deburring device 18 on the basis of a time chart shown in FIG. 15 and a flowchart shown in FIG. 16. In addition, S indicates a step.

First, in S1, initialization is performed. As this initialization, the first stopper 68 is brought into an advanced state. After the initialization in S1 is finished, in S2, it is judged whether or not there are workpieces W finished with the processing in the cutting device 2 (standby workpieces W) at the standby position (the second stopper 71 position). This is because it is impossible to advance deburring machining in a state in which there are no workpieces W standby. Therefore, the process is returned when it is NO in S2. On the other hand, when it is YES in S2, in S3, it is judged whether or not the first stopper 68 is in an advanced state. This is because deburring machining may be ready only after satisfying that there are workpieces W at the standby position and the first stopper 68 is in an advanced state. Therefore, in the same way as the case where it is NO in S2, the process is returned when it is NO in S3. On the other hand, when it is YES in S3, in S4, the second stopper 71 (the pair of stopper claws 71*a* and 71*b*) is switched, and only one workpiece W is carried toward the machining position (the first stopper 68 position) by the pair of guide rails 17.

When the second stopper 71 in S4 is switched, in S5, it is judged whether or not there are workpieces W to be machined (machining workpieces W) at the machining position (the first stopper 68 position). When it is NO in S5, the judgment in S5 is repeated. On the other hand, when it is YES in S5, in S6, the pair of pinching members 60 of the chuck device 52 start chucking (pinching) the stem portion W1 of the workpiece W. Then, in the following S7, in wait for the completion of pinching the stem portion W1 of the workpiece W by the pair of pinching members 60, the first stopper 68 is moved backward (exits from the pair of guide rails 17) (S8). According to the first stopper 68 moving backward, in S9, the deburring unit 33 starts moving up, and in the following S10, it is judged whether or not the machining load sensor is turned OFF, and when it is NO in S10, the process is returned to the aforementioned S9. Thereby, according to the deburring tool 35 moving up, the cut end (the other end) of the stem portion W1 of the workpiece W is inserted into the deburring tool 35, and the burr 16 on the cut end face rim portion of the stem portion W1 of the workpiece W is gradually eliminated by the blade portion 46*a* of the blade tool 46 in the deburring tool 35 according to the deburring tool 35 moving up. Thereafter, when it is judged as YES in S10, deburring of a given amount is performed, and the deburring unit 33 is moved down in the following S11. In wait for that the deburring unit 33 comes back to the standby position (S12), chuck-release of the stem portion W1 of the workpiece W by the pair of pinching members 60 of the chuck device 52 is started, and the workpiece W finished with the deburring machining is carried out to the grinding process. When the chuck-release of the stem portion W1 of the workpiece is completed (S14), the first stopper 68 is brought into an advanced state (S15), and thereafter, the process is returned to repeat the processings until now.

Figure 17:
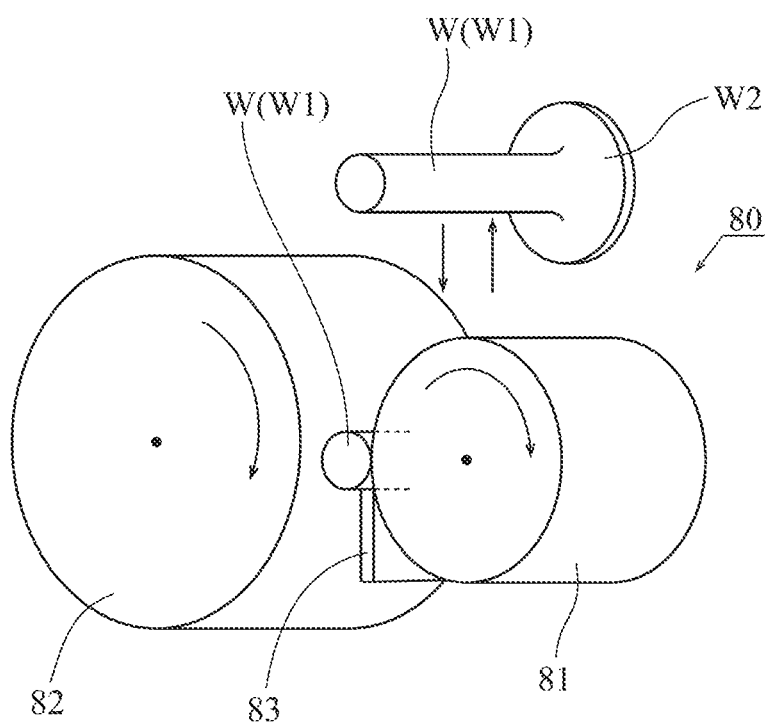
FIG. 17 is an explanatory diagram for explanation of a centerless grinding device according to the embodiment.

The workpiece W carried out from the deburring device 18 is carried to the grinding process by the pair of guide rails 1. This grinding process has a role of grinding (rough-grinding) the stem portion W1 of the workpiece W. Therefore, in the grinding process, as shown in FIG. 17, a centerless grinding device (infeed grinding device 80) is provided as a grinding device, and the centerless grinding device 80 is, as is well known, equipped with an adjustment rubbing stone 81, a grinding rubbing stone 82 which performs surface grinding while rotating the workpiece W so as to pinch the workpiece W (stem portion W1) with the adjustment rubbing stone 81, and a blade 83 which is disposed between the adjustment rubbing stone 81 and the grinding rubbing stone 82, to support the workpiece W (stem portion W1). Thereby, as shown by an arrow in FIG. 17, the workpiece W is put between the grinding rubbing stone 82 and the adjustment rubbing stone 81 from above, and the workpiece W is rotated by the grinding rubbing stone 82 and the adjustment rubbing stone 81, thereby grinding the stem portion W1 of the workpiece W. In this case, because the burr 16 on the cut end face rim portion of the stem portion W1 of the workpiece is already eliminated in the deburring process, and the workpiece W with no burr 16 on the stem portion W1 of the workpiece is carried to this grinding process (the centerless grinding device 80), abnormal wear is not generated in the adjustment rubbing stone 81 and the grinding rubbing stone 82 in any case. The workpiece W finished with this grinding process is carried to the following process.

The embodiment has been described above. However, the following modes are incorporated in the present invention.

I. The pair of carrier members are composed of a conveyor using a pair of rope members.

II. In spite of that the blade tool 42 is provided on the deburring tool 35, a rubbing stone surface is formed on the inner circumferential surface 42a of the recess in the deburring tool 35.

EXPLANATION OF SYMBOLS

1 . . . Machining line (machining apparatus)
2 . . . Cutting device
16 . . . Burr
17 . . . A pair of guide rails (a pair of carrier members, carrier means)
18 . . . Deburring device
21 . . . Attachment substrate
30 . . . First through-hole (through-hole)
31 . . . Second through-hole (through-hole)
32 . . . Third through-hole (through-hole)
35 . . . Deburring tool
40 . . . Driving cylinder device for deburring unit (driving means for deburring tool)
42 . . . Recess in deburring tool
46 . . . Blade tool
46a . . . Blade portion (deburring machining section)
52 . . . Chuck device
60 . . . A pair of pinching members
61 . . . Driving device for chuck device
63 . . . Machining load sensor (displacement motion detecting sensor)
65 . . . First stopper device
66 . . . Second stopper device
67 . . . First stopper driving device
68 . . . First stopper
70 . . . Second stopper driving device
71 . . . Second stopper
72 . . . First stopper mode change detecting sensor (first stopper mode change detecting means)
74 . . . Machining workpiece checking sensor (machining object detecting means)
75 . . . Chuck completion checking sensor (pinching state detecting means)
77 . . . Chuck-release completion checking sensor (pinching state detecting means)
80 . . . Centerless grinding device (grinding device)
U . . . Control unit (control means)
W . . . Workpiece (machining object)
W1 . . . Stem portion
W2 . . . Head portion (expanded diameter portion)

The invention claimed is:

1. A machining apparatus, on condition that a machining object has a stem portion and an expanded diameter portion which is integrated with one end side of the stem portion, so as to expand its diameter larger than the stem portion, comprising:
a cutting device that cuts the stem portion of the machining object;
a grinding device that grinds the stem portion of the machining object; and
a pair of carrier members which are disposed so as to extend with a space between the cutting device and the grinding device, the pair of carrier members carry the machining object from the cutting device to the grinding device,
and in which, when the pair of carrier members carry the machining object, the expanded diameter portion of the machining object is made to stride over the pair of carrier members, and the stem portion of the machining object is suspended downward from between the pair of carrier members, the apparatus wherein
a pair of pinching members which pinch the stem portion of the machining object when the machining object is carried to a predetermined machining position on the pair of carrier members, and a deburring tool which is disposed lower than the pair of pinching members, to perform deburring with respect to the stem portion of the machining object pinched by the pair of pinching members are disposed under the pair of carrier members,
the deburring tool has a recess for insertion of the stem portion of the machining object pinched by the pair of pinching members so that an opening of the recess faces the other end face of the stem portion of the machining object, and is capable of a displacement motion in an axis extension direction of the recess while rotating around an axis of the recess,
an inner circumferential surface of the recess in the deburring tool is formed so as to reduce its diameter as an inner diameter of the recess partitioned by the inner circumferential surface of the recess goes from an opening side of the recess toward an internal side of the recess, and
a deburring machining section for performing deburring is provided on the inner circumferential surface of the recess.

2. The machining apparatus according to claim 1, wherein
the pair of pinching members are provided so as to be capable of a displacement motion in a displacement motion direction of the deburring tool, and
biasing means is associated with the pair of pinching members so as to increase repulsion force as the pair of pinching members approach the pair of carrier members.

3. The machining apparatus according to claim 2 further comprising:
displacement motion detecting means for detecting a displacement motion of the pair of pinching members; and
control means for controlling the deburring tool to stop deburring machining with respect to the stem portion of the machining object pinched by the pair of pinching members when it is detected that the pair of pinching members make a displacement motion from a reference position at which external force for making a displacement motion is not applied, to a predetermined displacement motion position based on information from the displacement motion detecting means.

4. The machining apparatus according to claim 1 further comprising:
a first stopper which is capable of selecting a movement restriction mode of restricting the machining object at a predetermined machining position on the pair of carrier members from moving from the predetermined machining position to a carrying downstream side, and a movement allowable mode of releasing the movement restriction mode to allow the machining object to move, and which switches to the movement allowable mode when the pair of pinching members pinch (hold) the stem portion of the machining object at the predetermined machining position, and switches to the movement restriction mode when the pair of pinching members release pinching (holding) of the stem portion of the machining object at the predetermined machining position, and
a second stopper which restricts a movement of the machining object at a predetermined standby position on a carrying upstream side from the predetermined machining position on the pair of carrier members, and on the other hand, when the first stopper selects the movement restriction mode, releases only the movement restriction on a front machining object among machining objects on the carrying upstream side from the predetermined standby position, to move the front machining object toward the first stopper.

5. The machining apparatus according to claim 4, wherein the pair of carrier members are set as a pair of guide rails so that its height position becomes higher as it goes toward the carrying upstream side, and a machining object carried by the pair of carrier members slides on the pair of carrier members under its own weight.

6. The machining apparatus according to claim 5, wherein the first stopper is set so as to enter a moving region of the stem portion of the machining object when the first stopper selects the movement restriction mode, and exit from the moving region of the stem portion of the machining object when the first stopper selects the movement allowable mode.

7. The machining apparatus according to claim 6, wherein an attachment substrate having a through-hole is provided so as to be capable of adjusting a tilting motion in a standing state,
the attachment substrate is disposed so that the pair of carrier members and a machining object carried by the pair of carrier members pass through the through-hole between the cutting device and the grinding device,
the deburring tool is attached to the attachment substrate via deburring tool driving means for causing the deburring tool to make a displacement motion,
the pair of pinching members are provided on the attachment substrate on the upper side of the deburring tool, and
the attachment substrate is tilted so that the opening of the recess in the deburring tool faces the other end face of the stem portion of the machining object restricted from moving by the first stopper by adjusting a tilting motion.

8. The machining apparatus according to claim 7, wherein the pair of pinching members are attached to the attachment substrate so as to be capable of a displacement motion in an axis extension direction of the deburring tool, and
the biasing means is interposed between the pair of pinching members and the attachment substrate so as to increase repulsion force as the pair of pinching members approach the pair of carrier members.

9. The machining apparatus according to claim 4 further comprising:
pinching state detecting means for detecting a pinching state of the pair of pinching members with respect to the stem portion of the machining object at the predetermined machining position;
first stopper mode change detecting means for detecting a mode change of the first stopper; and
control means for switching the first stopper to the movement restriction mode when it is judged that pinching with respect to the stem portion of the machining object at the predetermined machining position is released to carry out the machining object based on information from the pinching state detecting means, and for controlling the second stopper to release the movement restriction on the front machining object among machining objects on the carrying upstream side from the predetermined standby position when it is judged that the mode of the first stopper is changed to the movement restriction mode based on information from the first stopper mode change detecting means.

10. The machining apparatus according to claim 9 further comprising machining object detecting means for detecting whether or not there is a machining object at the predetermined machining position, wherein
the control means controls the pair of pinching members so that the pair of pinching members pinch the stem portion of the machining object at the predetermined machining position when it is judged that there is a machining object at the predetermined machining position based on information from the machining object detecting means, and
the control means moves the deburring tool toward the end face of the stem portion of the machining object when it is judged that the pair of pinching members pinch the stem portion of the machining object at the predetermined machining position based on information from the pinching state detecting means.

11. The machining apparatus according to claim 1, wherein a blade portion of a blade tool is disposed, as the deburring machining section, on the inner circumferential surface of the recess in the deburring tool so as to extend in a depth direction of the recess along the inner circumferential surface of the recess.

12. The machining apparatus according to claim 11, wherein
a notch is formed in the deburring tool so as to extend in the axis extension direction of the recess in the deburring tool, and
the cutting tool is attached to a notched end face of the notch so as to be detachable.

13. A deburring device which is used in a machining apparatus, on condition that a machining object has a stem portion and an expanded diameter portion which is integrated with one end side of the stem portion, so as to expand its diameter larger than the stem portion, comprising:
a cutting device that cuts the stem portion of the machining object;
a grinding device that grinds the stem portion of the machining object; and
a pair of carrier members which are disposed so as to extend with a space between the cutting device and the grinding device, the pair of carrier members carry the machining object from the cutting device to the grinding device, and in which, when the pair of carrier members carry the machining object, the expanded diameter portion of the machining object is made to stride over the pair of carrier members, and the stem portion of the machining object is suspended downward from between the pair of carrier members, the deburring device wherein a pair of pinching members which pinch the stem portion of the machining object when the machining object is carried to a predetermined machining position on the pair of carrier members, and a deburring tool which is disposed lower than the pair of pinching members, to perform deburring with respect to the stem portion of the machining object pinched by the pair of pinching members are disposed under the pair of carrier members, the deburring tool has a recess for insertion of the stem portion of the machining object pinched by the pair of pinching members so that an opening of the recess faces the other end face of the stem portion of the machining object, and is capable of a displacement motion in an axis extension direction of the recess while rotating around an axis of the recess, an inner circumferential surface of the recess in the deburring tool is formed so as to reduce its diameter as an inner diameter of the recess partitioned by the inner circumferential surface of the recess goes from an opening side of the recess toward an internal side of the recess, and a deburring machining section for performing deburring is provided on the inner circumferential surface of the recess.

\* \* \* \* \*